US011074769B2

(12) United States Patent
Balakrishnan et al.

(10) Patent No.: US 11,074,769 B2
(45) Date of Patent: Jul. 27, 2021

(54) SAFETY FOR VEHICLE USERS

(71) Applicant: Cambridge Mobile Telematics Inc., Cambridge, MA (US)

(72) Inventors: Hari Balakrishnan, Belmont, MA (US); Ben Bowne, Rockwall, TX (US); Lewis David Girod, Arlington, MA (US); James E. Hicks, Jr., Newton, MA (US); Samuel Ross Madden, Newton, MA (US); Katherine Wellman, Dover, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

(21) Appl. No.: 16/407,502

(22) Filed: May 9, 2019

(65) Prior Publication Data
US 2020/0312062 A1 Oct. 1, 2020

Related U.S. Application Data

(60) Provisional application No. 62/823,811, filed on Mar. 26, 2019.

(51) Int. Cl.
*G07C 5/08* (2006.01)
*G07C 5/00* (2006.01)
(Continued)

(52) U.S. Cl.
CPC ............ *G07C 5/0816* (2013.01); *B60Q 9/00* (2013.01); *G07C 5/008* (2013.01); *G08B 21/02* (2013.01)

(58) Field of Classification Search
USPC ............ 340/425.5, 426, 12, 426.13, 426.16, 340/426.17, 426.18, 426.2
See application file for complete search history.

(56) References Cited

U.S. PATENT DOCUMENTS 6,980,092 B2 * 12/2005 Turnbull ................ B60R 1/12
307/10.1
7,266,204 B2 * 9/2007 Watson ................. B60R 1/12
340/426.16
(Continued)

FOREIGN PATENT DOCUMENTS

EP 1785964 5/2007

OTHER PUBLICATIONS

U.S. Appl. No. 16/035,861, filed Jul. 16, 2018, Shea et al.
Estrada [online], "Meet the hot new dash cam you can control from your smartphone," bgr.com, Aug. 1, 2018, retrieved on Mar. 21, 2019, URL <https://bgr.com/2018/07/31/amazon-dash-cam-goluk-t2/>, 2 pages.

(Continued)

*Primary Examiner* — Brent Swarthout
(74) *Attorney, Agent, or Firm* — Fish & Richardson P.C.

(57) ABSTRACT

Personal safety concerns for users of vehicles can be indicated, identified, communicated, analyzed, or acted on to make the users and other participants in the technology aware of the safety concerns and to reduce the risks to the users associated with the safety concerns. Personal safety concerns can be recognized based on safety concern triggers. Once recognized, the personal safety concerns can be reported to the users and other participants in the technology by safety alerts. The safety alert can prompt one or more telematics devices at the vehicle to capture, store, or transmit telematics data, including, for example, audio, image, or video data or combinations of them. The captured telematics data can be used to verify the safety alert and the safety concern and present the captured data to a third party participant to enable the third party participant to determine an appropriate response or action.

27 Claims, 20 Drawing Sheets

Figure 1A:
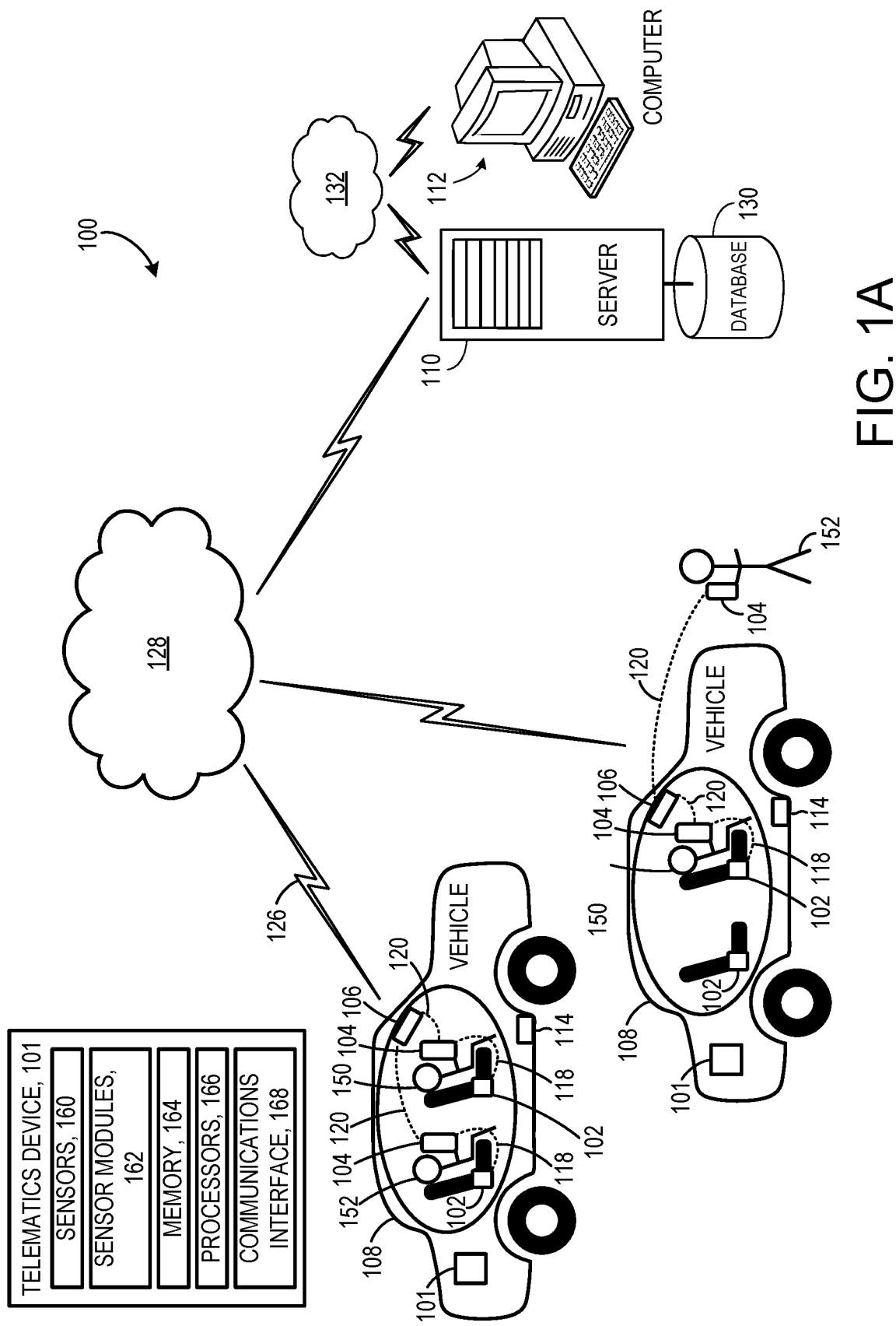

(51) Int. Cl.
*B60Q 9/00* (2006.01)
*G08B 21/02* (2006.01)

(56) References Cited

U.S. PATENT DOCUMENTS

| | | | |
|---|---|---|---|
| 7,386,376 | B2 | 6/2008 | Basir et al. |
| 9,961,306 | B1 | 5/2018 | Lev et al. |
| 2003/0169522 | A1 | 9/2003 | Schofield et al. |
| 2006/0033615 | A1 | 2/2006 | Nou |
| 2011/0134553 | A1 | 6/2011 | Heslin et al. |
| 2011/0161140 | A1 | 6/2011 | Polt |
| 2012/0105635 | A1* | 5/2012 | Erhardt ............... B60R 25/102 348/148 |
| 2015/0312665 | A1 | 10/2015 | Balakrishnan et al. |
| 2016/0188977 | A1 | 6/2016 | Kearns et al. |
| 2018/0295316 | A1 | 10/2018 | Callis |
| 2018/0300816 | A1* | 10/2018 | Perl ..................... G06Q 50/01 |
| 2019/0009721 | A1 | 1/2019 | Schofield et al. |
| 2020/0312063 | A1 | 10/2020 | Balakrishnan et al. |

OTHER PUBLICATIONS

OkMe [online], "Panic button for ride-share drivers," OkMe.info, retrieved on Mar. 21, 2019, URL <https://www.okme.info/>, 1 page.
Pruveeo Official Site [online], "Pruveeo MX2 Dash Cam Front and Rear Dual Camera for Cars, 240 Degree Wide Angle," Pruveeo.us, retrieved on Mar. 21, 2019, URL <https://pruveeo.us/product/pruveeo-mx2-car-dash-cam-dual-lens-240-degree-wide-angle-dashboard-camera-driving-recorder-with-g-sensor-loop-recording-for-vehicles>, 3 pages.
USPTO Transaction History for U.S. Appl. No. 62/823,811, retrieved on May 9, 2019, 126 pages.
PCT International Search Report and Written Opinion in International Appln. PCT/US2020/23685, dated Aug. 7, 2020, 10 pages.
PCT Invitation to Pay Additional Fees and, where Applicable, Protest Fee in International Appln. No. PCT/US2020/23685, dated Jun. 4, 2020, 2 pages.

* cited by examiner

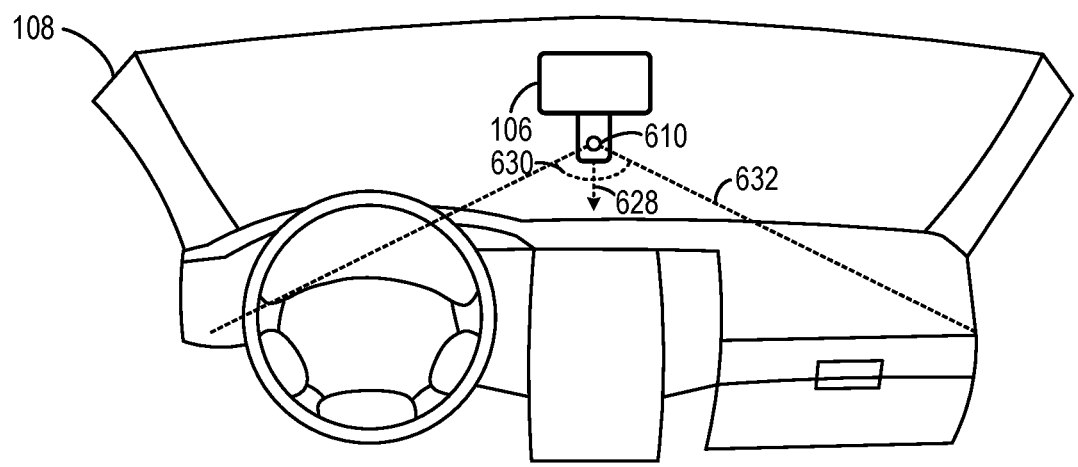
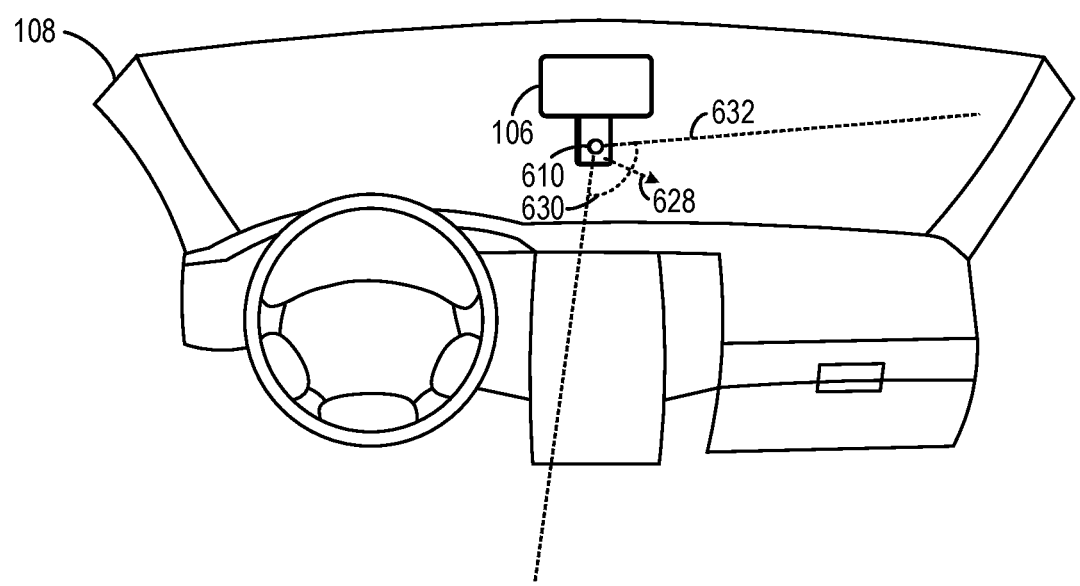
FIG. 7B

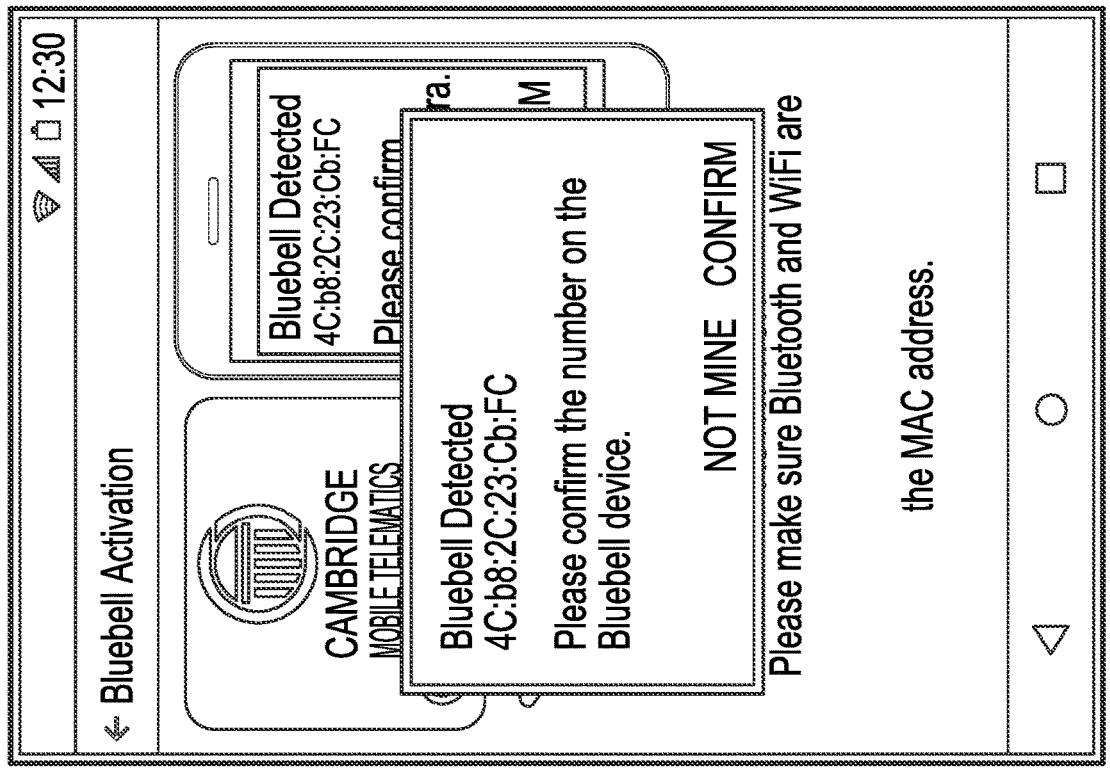
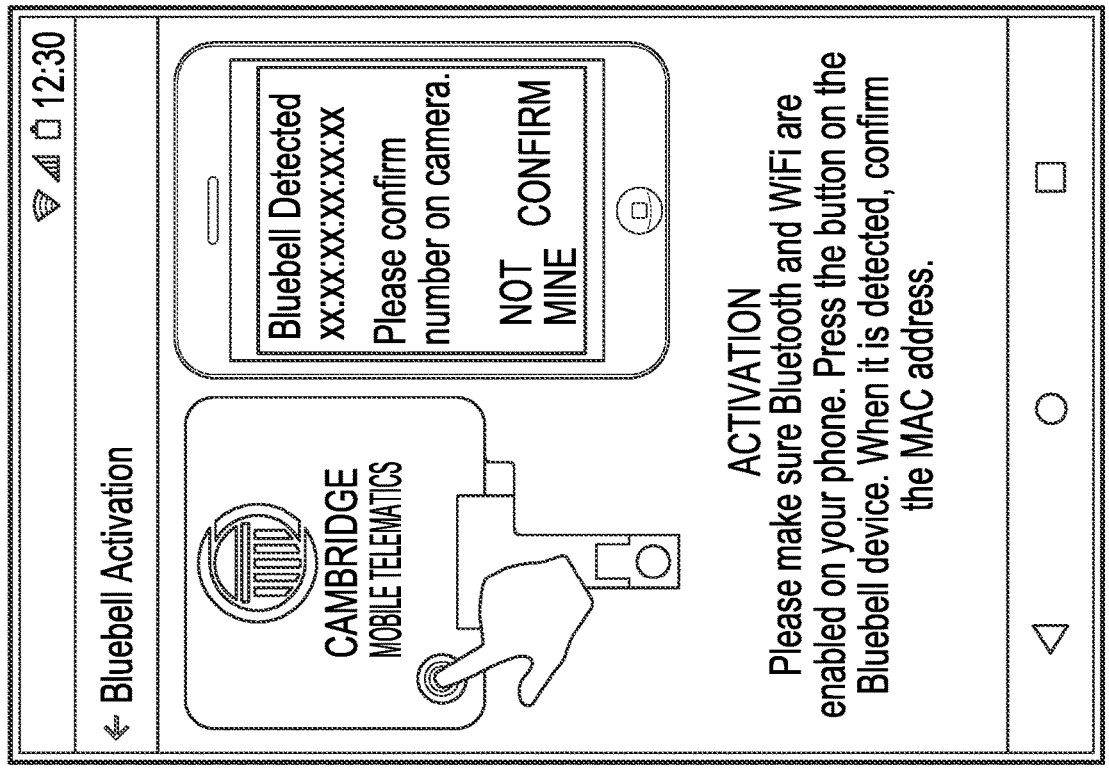
FIG. 12

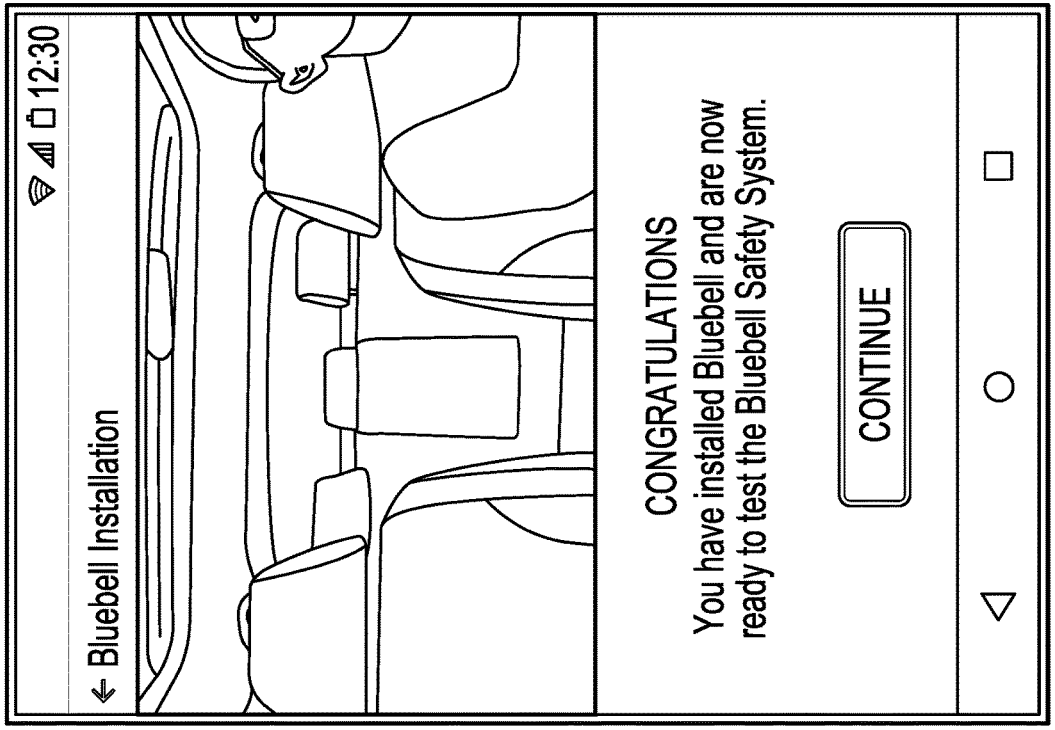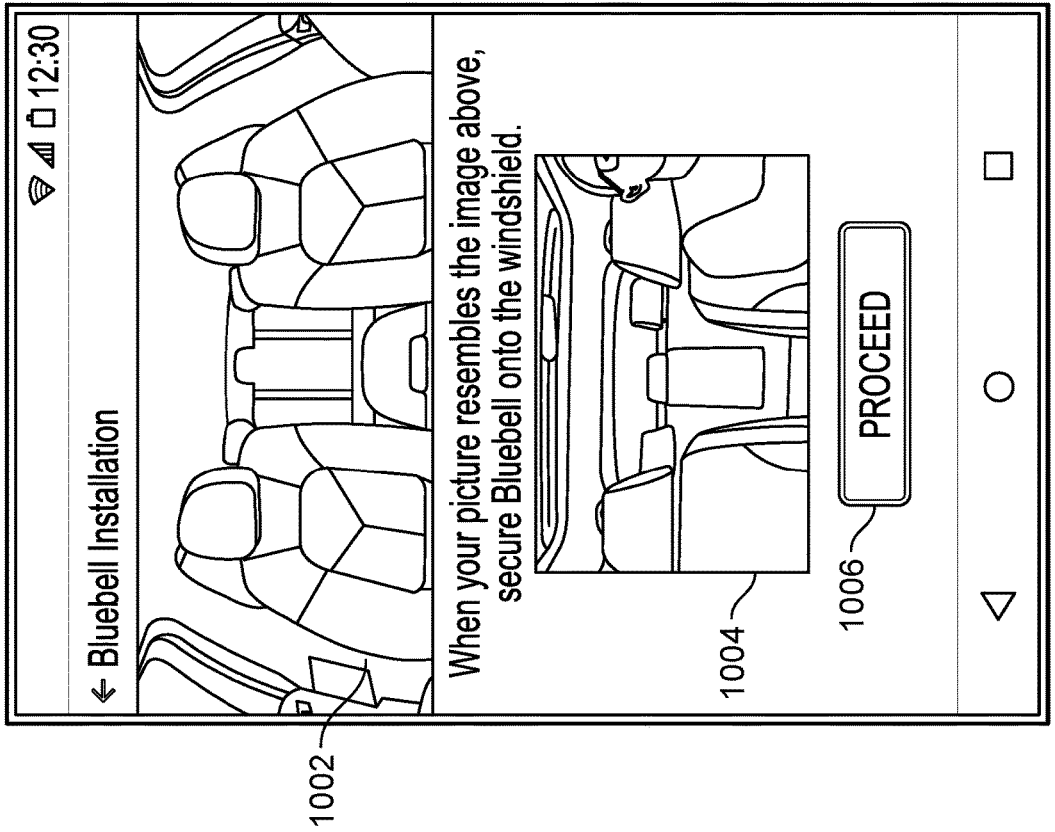
FIG. 14

SAFETY FOR VEHICLE USERS

CROSS-REFERENCE TO RELATED APPLICATIONS

This application claims priority to and the benefit of U.S. provisional application 62/823,811, filed on Mar. 26, 2019, which is incorporated here by reference in its entirety.

BACKGROUND

This description relates to safety for vehicle users. The typical dangers of vehicles and of driving and riding in vehicles are compounded by risky driving behaviors, such as distracted driving, driving while incapacitated, and other unsafe driving habits, and by risks of using ridesharing services, such as physical attacks on drivers and riders. Government agencies, insurance adjusters, ridesharing companies, and society as a whole have an interest in making vehicle users safer. Existing systems can be used to monitor unsafe driving habits and to enable vehicle users to raise alarms when their safety is at risk.

SUMMARY

In general, in an aspect, telematics data associated with a personal safety concern is produced at a vehicle in response to a personal safety alert received from a mobile device indicating the personal safety concern for a person at the vehicle. The telematics data includes one or a combination of two or more of audio, image, and video data. The produced telematics data is sent for action with respect to the personal safety concern.

Implementations may include one or a combination of two or more of the following features. Producing the telematics data can include acquiring telematics data from one or more sensors at the vehicle. Acquiring the telematics data can include acquiring telematics data from one or a combination of two or more of an accelerometer, a magnetometer, a barometer, a speedometer, a gyroscope, a compass, a position sensor, an image sensor, and a microphone. The personal safety alert can be received by a telematics device at the vehicle. The personal safety alert can be received from the mobile device over a wireless communication channel. Producing the telematics data can include producing the telematics data at a telematics device or a mobile device, or both. The personal safety alert can be associated with one or more impacts associated with the vehicle. The personal safety alert can be associated with a noise in the vehicle exceeding a predetermined noise threshold. The personal safety alert can be associated with a command voiced within the vehicle matching a predefined voice command. The predefined voice command can be selected by the person at the vehicle. The method can include detecting an activation of a personal safety alert button and in which the personal safety alert is generated in response to detecting the activation. The personal safety alert button can include a physical button in the vehicle. The personal safety alert button can include a software button presented in a user interface on a user device. The personal safety alert can be associated with incapacity of the person at the vehicle. The personal safety alert can be associated with a relationship of a geographic location of the vehicle to a predetermined geographic boundary. The personal safety alert can be associated with detecting an object in a path of the vehicle. The personal safety alert can be associated with the vehicle being in close proximity to another vehicle. The personal safety alert can be associated with detecting that the vehicle is at an intersection. The personal safety alert can be associated with an inertial event of the vehicle that exceeds a predetermined inertial magnitude. The personal safety alert can be associated with detecting that a telematics device has been tampered with. The personal safety alert can be associated with distraction of the driver of the vehicle. The personal safety alert can be silent or non-visible or both. The producing of telematics data at the vehicle can include capturing one or more images at the vehicle. The one or more images can include images of an interior of the vehicle. The one or more images can include images of an area exterior to the vehicle. The one or more images can include a video. The producing of telematics data at the vehicle can include capturing audio data. The telematics data can be stored persistently. Sending the assembled telematics data can include sending the assembled telematics data to a mobile device of the person. The person can be a driver or a passenger of the vehicle. The method can include receiving the personal safety alert from the person. The sending of the assembled telematics data can include sending the telematics data to the mobile device over a Bluetooth network, a Wi-Fi network, or another wireless network. The sending of the assembled telematics data can include sending the assembled telematics data to a server. Sending of the assembled telematics data can include sending the assembled telematics data to the server for remote processing to verify the personal safety alert. The sending of the assembled telematics data can include sending the assembled telematics data to a mobile device over a first network for forwarding by the mobile device to the server over a second network, and in which the first network and the second network are different network types. The server can be associated with one or a combination of two or more of an automotive safety organization, an insurance company, a ridesharing company, an emergency service, a call center, a user of the telematics device, or a user of the vehicle. The method can include causing a user interface to display the telematics data or the personal safety alert, or both. Producing of the telematics data can include producing the telematics data for a predetermined period of time before the sending of the assembled telematics data.

In general, in an aspect, an apparatus can include a telematics device at a vehicle configured to receive a personal safety alert indicating a personal safety concern for a person at a vehicle, produce, at the vehicle, telematics data associated with the personal safety concern, the telematics data including one or a combination of two or more of audio, image, and video data, and send the produced telematics data to a recipient device for action with respect to the personal safety concern.

In general, in an aspect, a non-transitory storage medium can include instructions executable by a processor to receive a personal safety alert indicating a personal safety concern for a person at a vehicle, produce, at the vehicle, telematics data associated with the personal safety concern, the telematics data including one or a combination of two or more of audio, image, and video data, and send the produced telematics data to a recipient device for action with respect to the personal safety concern.

In general, in an aspect, a method can include receiving telematics data produced by one or more telematics devices at a vehicle, the telematics data including a personal safety alert indicating a personal safety concern for a person at a vehicle and providing one or more signals based on the personal safety alert to cause one of the telematics devices to produce additional telematics data at the vehicle and to provide the additional telematics data to one or more recipient devices.

In general, in an aspect, a camera includes a housing comprising camera circuitry and a moveable stalk extending from the housing, the stalk comprising a first end and a second end, the first end being moveably coupled with the housing, the second end including an image sensor.

Implementations may include one or a combination of two or more of the following features. The camera circuitry can include a processor and storage for instructions executable by the processor to cause the camera to capture one or more images. The camera circuitry can include one or more communications systems. The one or more communications systems can include one or a combination of two or more of Bluetooth, Wi-Fi, and a cellular system. The camera circuitry can include one or more sensors. The one or more sensors can include one or more of an accelerometer, a magnetometer, a barometer, a speedometer, a gyroscope, a compass, a position sensor, and a microphone. The camera can include an actuator configured to rotate the moveable stalk in response to signals from the camera circuitry. The housing can include one or more batteries configured to power the camera. A first side of the housing can include a recess. The recess can be configured to hold a solar panel. The first side of the housing can include one or more adhesive strips. A second side of the housing can include one or more ventilation ports, the second side of the housing being opposite the first side. The camera can include a flexible connector for electrically coupling the first image sensor to the camera circuitry. The moveable stalk can extends along a first axis and is rotatable about a second axis, the first axis being perpendicular to the second axis. At least a portion of the moveable stalk can be rotatable about the first axis. The housing can include a speaker. The image sensor can include an infrared (IR) image sensor. The camera can include an IR illuminator configured to illuminate the field of view of the image sensor. The camera can include a second image sensor included within the moveable stalk. The second image sensor can be positioned toward the first end of the stalk. The second image sensor can be positioned on the opposite side of the moveable stalk from the first image. The second image sensor can include a wide-angle lens. The camera can include an LED indicator included within the moveable stalk. The moveable stalk can be moveably coupled to the housing by a pivot mechanism. The pivot mechanism can include one or more O-rings. The material of one or more of the O-rings can have a Shore A hardness between about 75 and about 90.

In general, in an aspect, a method includes receiving a request from a mobile device at a telematics device at a vehicle, the telematics device including a camera positioned to capture one or more images at the vehicle, and providing one or more signals to cause the camera to capture one or more images in response to receiving the request.

Implementations may include one or a combination of two or more of the following features. The camera can be an inward-facing camera positioned to capture the one or more images of an interior of the vehicle. The inward-facing camera can be positioned to capture the one or more images of both a front seat and a rear seat of the vehicle. The camera can be an outward-facing camera positioned to capture the one or more images of an area exterior to the vehicle. The camera can be coupled with an actuator configured to move the camera in response to the one or more signals. The camera can be configured to zoom in or zoom out in response to the one or more signals. The camera can include an infrared (IR) camera. The camera can include an IR illuminator configured to illuminate an area within the view of the camera. The camera can include a wide-angle lens. The telematics device can be configured to be attached within the vehicle. The telematics device can include a permanent adhesive or a semi-permanent adhesive for attachment within the vehicle. The one or more images can be a video. The camera can be configured to capture the one or more images at a rate indicated by the one or more signals. The camera can be configured to capture the one or more images at a resolution indicated by the one or more signals. A first image of the one or more images can be captured at a first resolution, and a second image of the one or more images can be captured at a second resolution, the first resolution being different than the second resolution. The telematics device can include a microphone configured to record audio in response to the one or more signals. The telematics device can be a tag device or a video tag device. The telematics device can be a mobile device. The one or more images can be sent to a server. The server can be associated with one or a combination of two or more of an automotive safety organization, an insurance company, a ridesharing company, an emergency service, a call center, a user of the telematics device, or a user of the vehicle. The telematics device can include one or more sensors configured to produce telematics data at the vehicle. The one or more sensors can include one or a combination of two or more of an accelerometer, a magnetometer, a barometer, a speedometer, a gyroscope, a compass, a position sensor, an image sensor, and a microphone. The method can include receiving the one or more images captured by the camera, detecting a personal safety concern for a person at the vehicle based on the telematics data or the one or more images, or both, and providing one or more additional signals to cause the camera to record one or more additional images at the vehicle based on the personal safety concern. The personal safety concern can be associated with one or more of a vehicle crash, an activation of a personal safety alert button, a distraction of the driver of the vehicle, an incapacity of the person at the vehicle, a relationship of a geographic location of the vehicle to a predetermined geographic boundary, a determination that the vehicle is at an intersection, a determination that the vehicle is in close proximity to another vehicle, a detection of an object in a path of the vehicle, a noise in the vehicle exceeding a predetermined noise threshold, a command voiced in the vehicle matching a predefined voice command, a physical altercation at the vehicle, an inertial event of the vehicle that exceeds a predetermined inertial magnitude, or a detection that the telematics device is tampered with. The one or more additional images can be captured at a different rate or resolution than the one or more images.

In general, in an aspect, a method includes receiving telematics data produced by one or more sensors associated with a telematics device at a vehicle, detecting that the vehicle is in use based on the telematics data, and providing one or more signals to cause a camera positioned within the vehicle to capture one or more images at the vehicle in response to detecting that the vehicle is in use. Implementations may include one or a combination of two or more of the following features. Detecting that the vehicle is in use can include detecting that the vehicle is on, detecting that a user has entered the vehicle or is within a proximity of the vehicle, or detecting that the telematics device is in the vehicle or is within a proximity of the vehicle.

In general, in an aspect, a personal safety system includes a camera positioned within a vehicle, a processor, and storage for instructions executable by the processor to detect a request between the personal safety system and a mobile device at a vehicle and provide one or more signals to cause the camera to capture one or more images at the vehicle in response to detecting the request.

Implementations may include one or a combination of two or more of the following features. The camera can be an inward-facing camera positioned to capture the one or more images of an interior of the vehicle. The inward-facing camera can be positioned to capture the one or more images of both a front seat and a rear seat of the vehicle. The camera can be an outward-facing camera positioned to capture the one or more images of an area exterior to the vehicle. The camera can be a mobile device camera. The camera can be coupled with an actuator configured to move the camera in response to the one or more signals. The camera can be configured to zoom in or zoom out in response to the one or more signals. The camera can include an infrared (IR) camera. The personal safety system can include an IR illuminator configured to illuminate an area within the view of the camera. The camera can include a wide-angle lens. The camera can be configured to be attached within the vehicle. The camera can include a permanent adhesive or a semi-permanent adhesive for attachment within the vehicle. The one or more images can be a video. The camera can be configured to capture the one or more images at a rate indicated by the one or more signals. The camera can be configured to capture the one or more images at a resolution indicated by the one or more signals. A first image of the one or more images can be captured at a first resolution, and a second image of the one or more images can be captured at a second resolution, the first resolution being different than the second resolution. The camera can include a microphone configured to record audio in response to the one or more signals. The personal safety system can include one or more communications systems to communicate the one or more signals from the processor to the camera. The communications systems can include one or more of Bluetooth, Wi-Fi, and a cellular system. The personal safety system can include a communications system to communicate the one or more images to a server. The server can be associated with one or a combination of two or more of an automotive safety organization, an insurance company, a ridesharing company, an emergency service, a call center, a user of the telematics device, a user of the vehicle, or the owner of the vehicle. The camera can be included in a telematics device. The telematics device can include one or more sensors configured to produce telematics data at the vehicle. The telematics device can include a tag device or a video tag device. The telematics device can include a mobile device. The storage of the personal safety system can include instructions executable by the processor to receive the one or more images captured by the camera, detect a personal safety concern for a person at the vehicle based on the telematics data or the one or more images, or both, and provide one or more additional signals based on the personal safety concern to cause the camera to record one or more additional images at the vehicle. The personal safety concern can be associated with one or more of a vehicle crash, an activation of a personal safety alert button, a distraction of the driver of the vehicle, an incapacity of the person at the vehicle, a relationship of a geographic location of the vehicle to a predetermined geographic boundary, a determination that the vehicle is at an intersection, a determination that the vehicle is in close proximity to another vehicle, a detection of an object in a path of the vehicle, a noise in the vehicle exceeding a predetermined noise threshold, a command voiced in the vehicle matching a predefined voice command, a physical altercation at the vehicle, an inertial event of the vehicle that exceeds a predetermined inertial magnitude, or a detection that the telematics device is tampered with. The one or more additional images can be captured at a different rate or resolution than the one or more images.

In general, in an aspect, a personal safety system includes a camera positioned within a vehicle, a processor, and storage for instructions executable by the processor to receive telematics data produced by one or more sensors associated with a telematics device at the vehicle, detect that the personal safety system is in use based on the telematics data, and provide one or more signals to cause the camera to capture one or more images at the vehicle in response to detecting that the personal safety system is in use. Detecting that the personal safety system is in use can include one or more of detecting that the personal safety system is on, detecting that the telematics device has connected to the personal safety system, detecting that the vehicle is on, detecting that a user has entered the vehicle or is within a proximity of the vehicle, or detecting that the telematics device is in the vehicle or is within a proximity of the vehicle.

In general, in an aspect, an apparatus includes a telematics device at a vehicle configured to receive a request from a mobile device, the telematics device including a camera positioned to capture one or more images at the vehicle and provide one or more signals to cause the camera to capture one or more images at the vehicle in response to the request.

In general, in an aspect, a non-transitory storage medium includes instructions executable by a processor to detect a request between a mobile device and a telematics device at a vehicle, the telematics device including a camera positioned to capture one or more images at the vehicle, and provide one or more signals to cause the camera to capture one or more images at the vehicle in response to detecting the request.

In general, in an aspect, a method includes receiving telematics data produced by one or more telematics devices at a vehicle, identifying a personal safety trigger related to the vehicle or a user of the vehicle based on the telematics data, and providing one or more signals to cause one or a combination of two or more of the telematics devices to produce additional telematics data in response to the personal safety trigger.

Implementations may include one or a combination of two or more of the following features. The telematics data can be produced by one or more sensors associated with the one or more telematics devices. The one or more sensors can include one or a combination of two or more of an accelerometer, a magnetometer, a barometer, a speedometer, a gyroscope, a compass, a position sensor, an image sensor, and a microphone. The one or more telematics devices can include one or a combination of two or more of a tag device, a video tag device, and a mobile device. One or a combination of two or more of the telematics devices can include a camera positioned within the vehicle. The additional telematics data can include one or more images captured by the camera in response to the one or more signals. The camera can be an inward-facing camera positioned to capture the one or more images of an interior of the vehicle. The inward-facing camera can be positioned to capture the one or more images of both a front seat and a rear seat of the vehicle. The camera can be an outward-facing camera positioned to capture the one or more images of an area exterior to the vehicle. The telematics device can be a mobile device, and the camera can be a camera of the mobile device.

The camera can be coupled with an actuator configured to move the camera in response to the one or more signals. The camera can be configured to zoom in or zoom out in response to the one or more signals. The camera can include an infrared (IR) camera. The camera can include an IR illuminator configured to illuminate an area within the view of the camera. The camera can include a wide-angle lens. The camera can be configured to be attached within the vehicle. The camera can include a permanent adhesive or a semi-permanent adhesive for attachment within the vehicle. The one or more images can be a video. The camera can be configured to capture the one or more images at a rate indicated by the one or more signals. The camera can be configured to capture the one or more images at a resolution indicated by the one or more signals. A first image of the one or more images can be captured at a first resolution, and a second image of the one or more images can be captured at a second resolution, the first resolution being different than the second resolution. One or a combination of two or more of the telematics device can include a microphone at the vehicle. The additional telematics data can include audio data captured by the microphone in response to the one or more signals. The personal safety trigger can be associated with one or more of a vehicle crash, an activation of a personal safety alert button, a distraction of the driver of the vehicle, an incapacity of the person at the vehicle, a relationship of a geographic location of the vehicle to a predetermined geographic boundary, a determination that the vehicle is at an intersection, a determination that the vehicle is in close proximity to another vehicle, a detection of an object in a path of the vehicle, a noise in the vehicle exceeding a predetermined noise threshold, a command voiced in the vehicle matching a predefined voice command, a physical altercation at the vehicle, an inertial event of the vehicle that exceeds a predetermined inertial magnitude, or a detection that the telematics device is tampered with. The method can include sending one or more of the telematics data, the triggering event, or the additional telematics data to a server. The server can be associated with one or a combination of two or more of an automotive safety organization, an insurance company, a ridesharing company, an emergency service, a call center, a user of the telematics device, or a user of the vehicle. The telematics data can include image data or audio data produced at the vehicle. The additional telematics data can be produced at a different rate or resolution than the telematics data. The additional telematics data can be produced at a higher rate than the telematics data. The method can include receiving the additional telematics data produced by one or a combination of two or more of the telematics device and verifying, based on the additional telematics data, the personal safety trigger to produce a verified personal safety trigger. The method can include providing, based on the verified personal safety trigger, one or more additional signals to cause one or a combination of two or more of the telematics device to adjust collection of future telematics data.

In general, in an aspect, a personal safety system can include a camera in a vehicle, a processor, and storage for instructions executable by the processor to receive telematics data produced by one or more sensors associated with a telematics device at the vehicle, identify a personal safety trigger related to the vehicle or a user of the vehicle based on the telematics data, and provide one or more signals to cause the camera to capture one or more images at the vehicle in response to the personal safety trigger.

Implementations may include one or a combination of two or more of the following features. The camera can be an inward-facing camera positioned to capture the one or more images of an interior of the vehicle. The inward-facing camera is positioned to capture the one or more images of both a front seat and a rear seat of the vehicle. The camera can be an outward-facing camera positioned to capture the one or more images of an area exterior to the vehicle. The camera can be included in the telematics device. The camera can be a mobile device camera. The camera can be coupled with an actuator configured to move the camera in response to the one or more signals. The camera can be configured to zoom in or zoom out in response to the one or more signals. The camera can include an infrared (IR) camera. The personal safety system can include an IR illuminator configured to illuminate an area within the view of the camera. The camera can include a wide-angle lens. The camera can be configured to be attached within the vehicle. The camera can include a permanent adhesive or a semi-permanent adhesive for attachment within the vehicle. The one or more images can be a video. The camera can be configured to capture the one or more images at a rate indicated by the one or more signals. The camera can be configured to capture the one or more images at a resolution indicated by the one or more signals. A first image of the one or more images can be captured at a first resolution, and a second image of the one or more images can be captured at a second resolution, the first resolution being different than the second resolution. The camera can include a microphone configured to record audio in response to the one or more signals. The one or more sensors can include one or a combination of two or more of an accelerometer, a magnetometer, a barometer, a speedometer, a gyroscope, a compass, a position sensor, an image sensor, and a microphone. The personal safety trigger can be associated with one or more of a vehicle crash, an activation of a personal safety alert button, a distraction of the driver of the vehicle, an incapacity of the user of the vehicle, a relationship of a geographic location of the vehicle to a predetermined geographic boundary, a determination that the vehicle is at an intersection, a determination that the vehicle is in close proximity to another vehicle, a detection of an object in a path of the vehicle, a noise in the vehicle exceeding a predetermined noise threshold, a command voiced in the vehicle matching a predefined voice command, a physical altercation at the vehicle, an inertial event of the vehicle that exceeds a predetermined inertial magnitude, or a detection that the telematics device is tampered with. The telematics device can include a tag device or a video tag device. The telematics device can include a mobile device. The personal safety system can include communications systems to communicate the one or more signals from the processor to the camera. The communications system can include one or more of a Bluetooth, a Wi-Fi, and a cellular system. The personal safety system can include communications systems to communicate one or more of the telematics data, the triggering event, the one or more signals, the one or more images, and audio recorded in response to the indication of the triggering event to a server. The server can be associated with one or a combination of two or more of an automotive safety organization, an insurance company, a ridesharing company, an emergency service, a call center, a user of the telematics device, or the occupant of the vehicle. The telematics data can include image data or audio data produced at the vehicle. The one or more images can be captured at a different rate or resolution than the image data. The storage of the personal safety system can include instructions executable by the processor to receive the one or more images captured by the camera and verify the personal safety trigger to produce a verified personal safety trigger based on the one or more images. The storage of the personal safety system can include instructions executable by the processor to provide one or more additional signals based on the verified personal safety trigger to cause the camera to record one or more additional images at the vehicle.

In general, in an aspect, an apparatus includes a telematics device at a vehicle configured to receive telematics data produced by one or more sensors at a vehicle, identify a personal safety trigger related to the vehicle or a user of the vehicle based on the telematics data, and provide one or more signals to cause one or a combination of two or more of the telematics devices to produce additional telematics data in response to the personal safety trigger.

In general, in an aspect, a non-transitory storage medium can include instructions executable by a processor to receive telematics data produced by one or more telematics devices at a vehicle, identify a personal safety trigger related to the vehicle or a user of the vehicle based on the telematics data, and provide one or more signals to cause one or a combination of two or more of the telematics devices to produce additional telematics data in response to the personal safety trigger.

In general, in an aspect, a method includes receiving a request from a first user device to join a personal safety technology, the first user device associated with a driver of a vehicle, receiving a request from a second user device to join the personal safety technology, the second user device associated with a passenger of the vehicle, providing each of the first user device and the second user device access to a telematics device within the vehicle, the telematics device configured to produce telematics data for both the driver and the passenger.

Implementations may include one or a combination of two or more of the following features. The first user device can include a mobile device. The telematics device can include a tag device, a video tag device, or a mobile device. The telematics device can include a camera positioned within the vehicle. The telematics data can include one or more images of both the driver and the passenger captured by the camera. The telematics device can include a microphone. The telematics data can include audio from both the driver and the passenger captured by the microphone. The telematics device can be configured to provide the telematics data to each of the first user device and the second user device. The telematics device can be configured to provide the telematics data for both the driver and the passenger to a trusted third party. The trusted third party can include one or a combination of two or more of an automotive safety organization, an insurance company, a ridesharing company, an emergency service, or a call center. The telematics device can be configured to receive a personal safety alert from the first mobile device and the second mobile device. The telematics device can be configured to detect a personal safety concern for the driver or the passenger by detecting a noise from the driver or the passenger that exceeds a predetermined noise threshold. The telematics device can be configured to detect a personal safety concern for the driver or the passenger by detecting a command voiced by the driver or the passenger that matches a predefined voice command. The telematics device can be tamper resistant. The telematics device can be configured to generate an alert to one or more of the first user device, the second user device, and a trusted third party in response to a tampering attempt. The telematics device can be battery powered.

In general, in an aspect, an apparatus includes a telematics device at a vehicle configured to receive a request from a first user device to join a personal safety technology, the first user device associated with a driver of a vehicle, receive a request from a second user device to join the personal safety technology, the second user device associated with a passenger of the vehicle, and provide each of the first user device and the second user device access to the telematics device at the vehicle, the telematics device configured to produce telematics data for both the driver and the passenger.

In general, in an aspect, a non-transitory storage medium includes instructions executable by a processor to receive a request from a first user device to join a personal safety technology, the first user device associated with a driver of a vehicle, receive a request from a second user device to join the personal safety technology, the second user device associated with a passenger of the vehicle, and provide each of the first user device and the second user device access to a telematics device within the vehicle, the telematics device configured to produce telematics data for both the driver and the passenger.

In general, in an aspect, a method includes receiving data associated with a telematics device located at a vehicle, the telematics device being part of a personal safety technology, determining a status of the personal safety technology based on the data, and generating an alert to a user of the personal safety technology based on the status, the alert including an indication of the status of the personal safety technology.

Implementations may include one or a combination of two or more of the following features. Determining the status of the personal safety technology can include determining, based on the data, whether the telematics device is powered on. Determining the status of the personal safety technology can include determining, based on the data, whether the telematics device is connected to the personal safety technology. Receiving the data associated with the telematics device can include receiving a battery level of the telematics device. Determining the status of the personal safety technology can include comparing the battery level of the telematics device with a threshold battery level and determining, based on the comparison, the status of the personal safety technology, in which the status is deemed to be unsafe in response to determining that the battery level of the telematics device is below the threshold battery level. Receiving the data associated with the telematics device can include receiving a unique identifier associated with the telematics device. Determining the status of the personal safety technology can include connecting the telematics device to the personal safety technology using the unique identifier, in which status is deemed to be unsafe in response to a failed connection using the unique identifier. Receiving the data associated with the telematics device can include receiving one or more images of an interior of the vehicle captured by the telematics device. The one or more images can be included in the alert to the user. Generating the alert can include determining that the user has entered the vehicle, causing the telematics device to capture the one or more images of the interior of the vehicle, in which the user is pictured in the one or more images, and providing the one or more images in the alert to the user. The telematics device can include a tag device at the vehicle. The telematics device can include a mobile device. The alert can be transmitted to a mobile device of the user. The alert can cause the mobile device to display a user interface including the indication of the status of the personal safety technology. The alert can include a recommendation to the user. The user can be a driver of the vehicle, and the recommendation comprises a notification to not accept a passenger into the vehicle. The user can be a passenger of the vehicle, and the recommendation comprises a notification to not enter the vehicle. The alert can include an audible indication of the status of the personal safety technology. The audible indication can be configurable by the user. The alert can include a visual indication of the status of the personal safety technology. The visual indication can include an image of the vehicle, a driver of the vehicle, or a passenger of the vehicle.

In general, in an aspect, and apparatus includes a telematics device at a vehicle configured to determine a status of personal safety technology based on data associated with the telematics device, the telematics device being part of the personal safety technology and generate an alert to a user of the personal safety technology based on the status, the alert including an indication of the status of the personal safety technology.

In general, in an aspect, a non-transitory storage medium includes instructions executable by a processor to receive data associated with a telematics device located at a vehicle, the telematics device being part of a personal safety technology, determine a status of the personal safety technology based on the data, and generate an alert to a user of the personal safety technology based on the status, the alert including an indication of the status of the personal safety technology.

In general, in an aspect, a method includes receiving telematics data produced by one or more sensors associated with a telematics device, the telematics data including audio data or video data captured at a vehicle and providing the telematics data to a mobile device associated with a user of the vehicle over a first network, and the telematics data to a server over a second network.

Implementations may include one or a combination of two or more of the following features. The first network and the second network can be different network types. The first network can be a Bluetooth network or a Wi-Fi network. The second network can be a cellular network or a Wi-Fi network. The server can be associated with one or a combination of two or more of an automotive safety organization, an insurance company, a ridesharing company, an emergency service, a call center, a user of the telematics device, or a user of the vehicle. The user of the vehicle can include a driver of the vehicle or a passenger of the vehicle. The video data can include video data of an interior of the vehicle or video data of an area exterior to the vehicle, or both. The telematics device can include a tag device or a video tag device. The telematics device can be configured to provide the telematics data to the mobile device in real time. The telematics device can be configured to capture the telematics data for a predetermined period of time before providing the telematics data to the mobile device. The telematics device can be configured to automatically provide the telematics data to the mobile device in response to detecting the presence of the mobile device on the first network. The method can include causing the telematics data to be stored persistently. The mobile device can be configured to provide the telematics data to the server in response to detecting a predetermined network type. The server can be configured to provide a user interface to present the telematics data to the user of the vehicle. The server can be configured to analyze the video data or the audio data, or both, to determine the driving behavior of a driver of the vehicle. The server can be configured to provide an indication of the driving behavior to the driver through a user interface. The server can be configured to analyze the video data or the audio data, or both, to determine whether a driver or a passenger of the vehicle is incapacitated. The server can be configured to analyze the video data or the audio data, or both, to identify a vehicle crash. The server can be configured to provide the telematics data to a call center.

In general, in an aspect, an apparatus includes a telematics device at a vehicle configured to receive telematics data produced by one or more sensors associated with the telematics device, the telematics data including audio data or video data captured at a vehicle and provide the telematics data to a mobile device associated with a user of the vehicle over a first network, and the telematics data to a server over a second network.

In general, in an aspect, a non-transitory storage medium includes instructions executable by a processor to receive telematics data produced by one or more sensors associated with a telematics device, the telematics data including audio data or video data captured at a vehicle and provide the telematics data to a mobile device associated with a user of the vehicle over a first network, and the telematics data to a server over a second network.

These and other aspects, features, and implementations can be expressed as methods, apparatus, systems, components, program products, methods of doing business, means or steps for performing a function, and in other ways, and will become apparent from the following description, including the claims.

DESCRIPTION

Figure 1B:
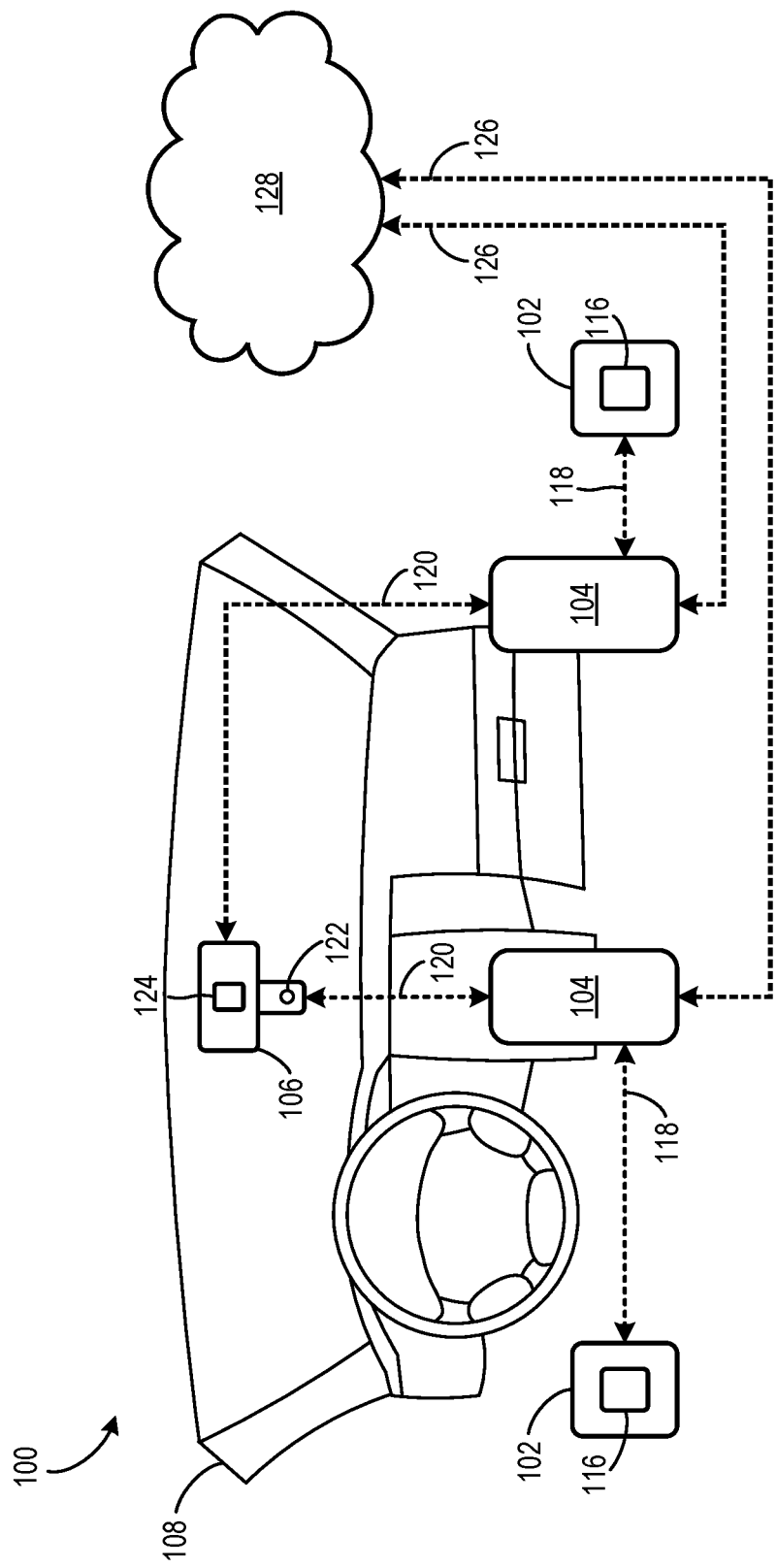
Figure 2:
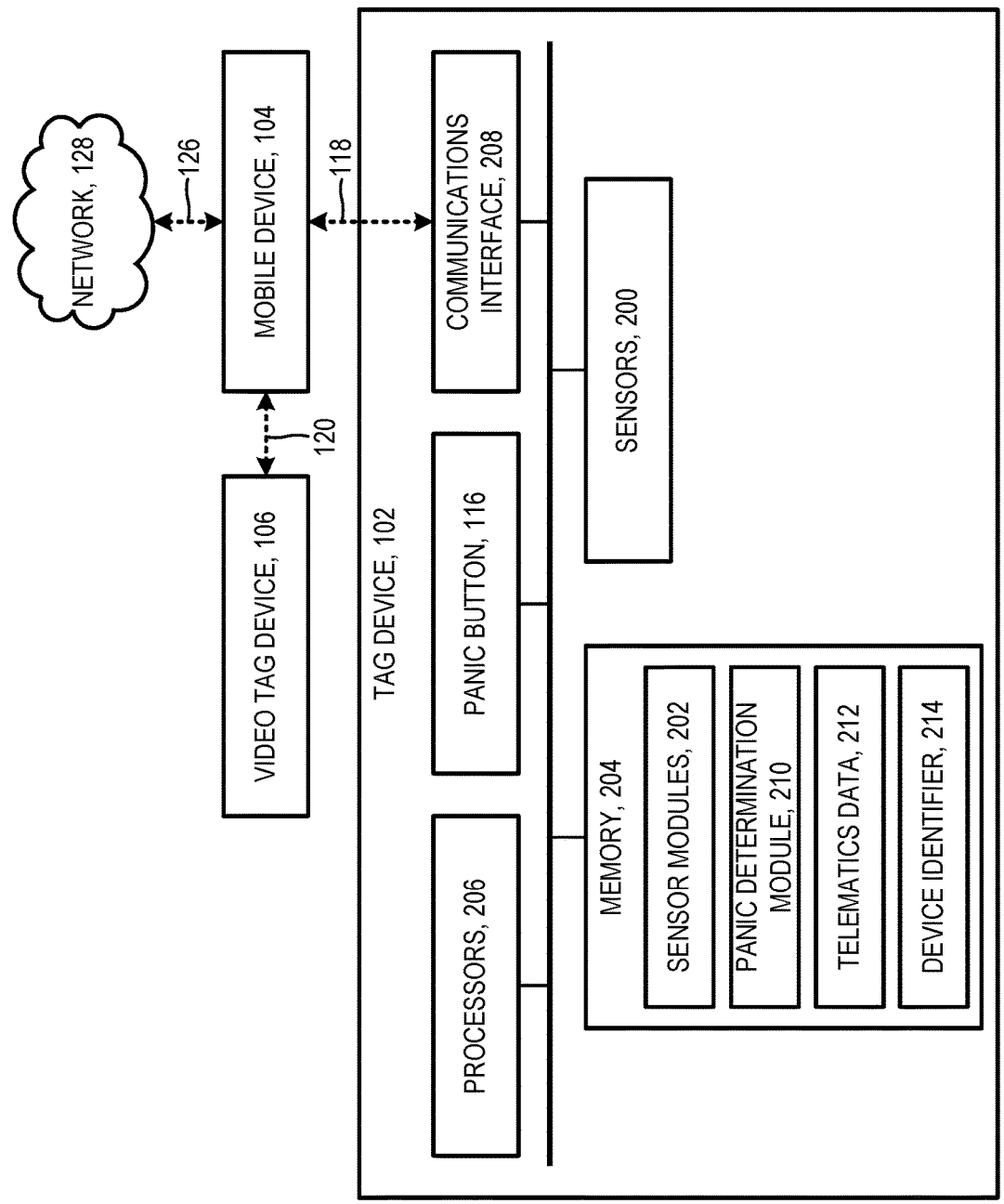
Figure 3:
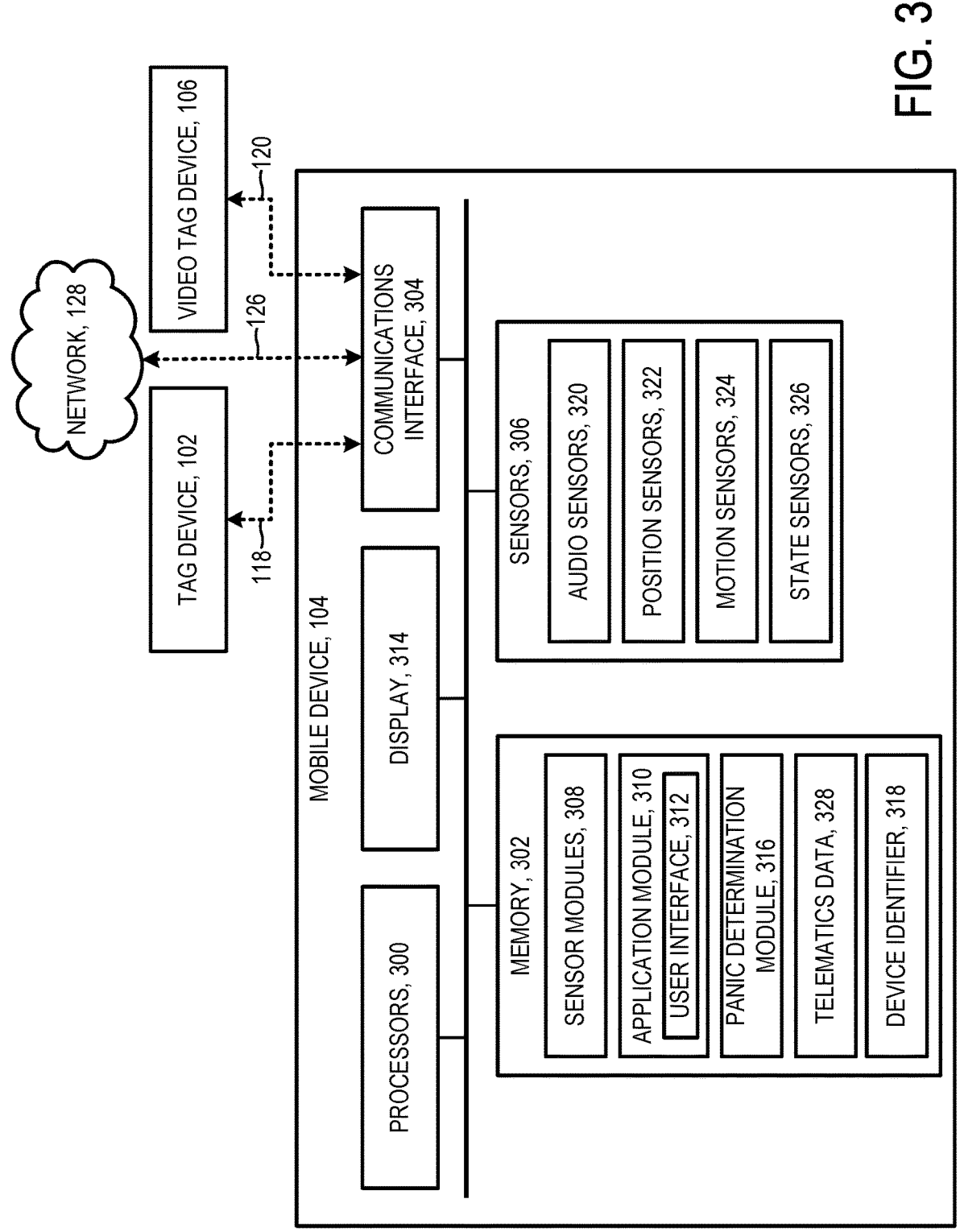
Figure 4:
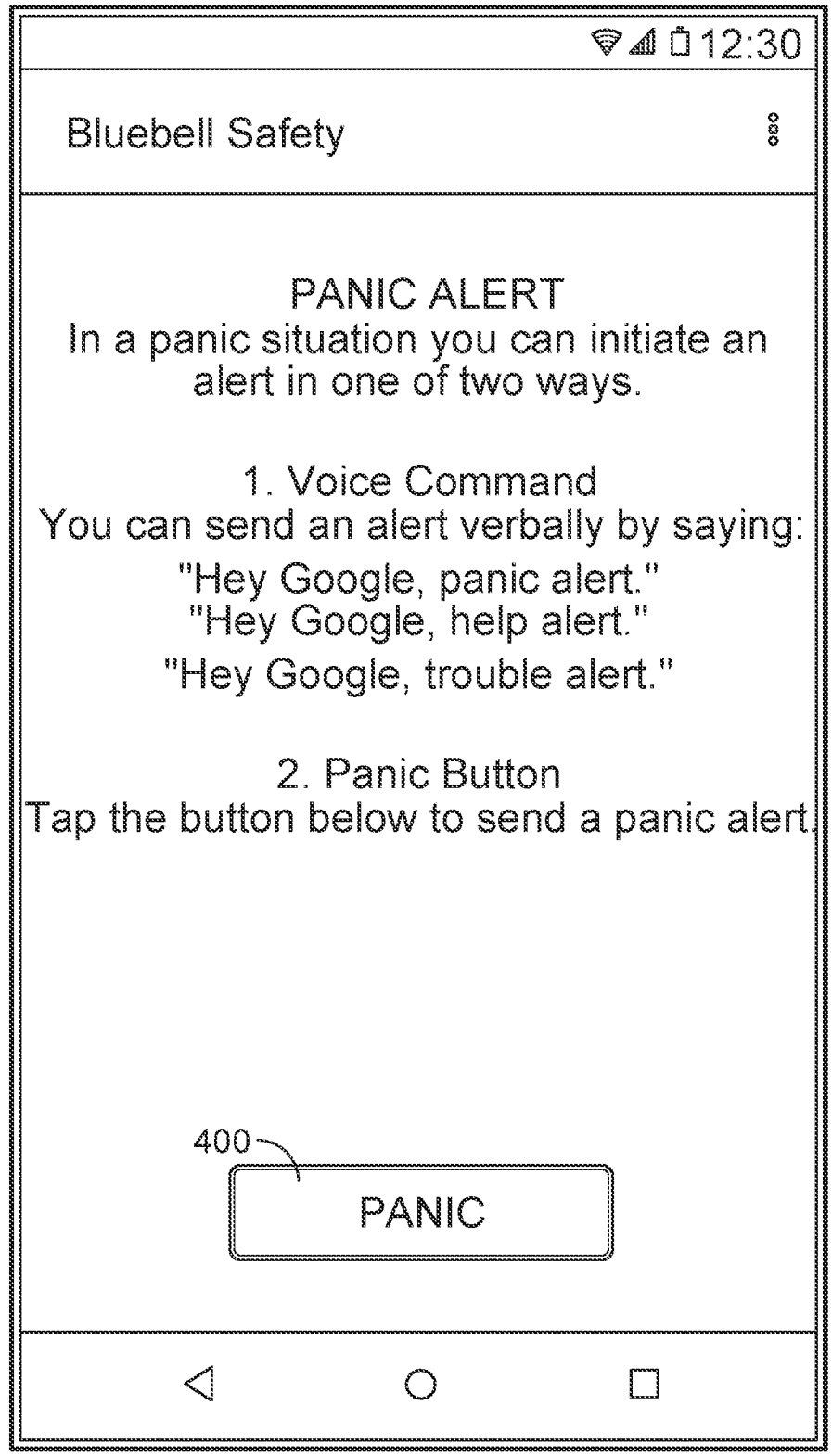
Figure 5:
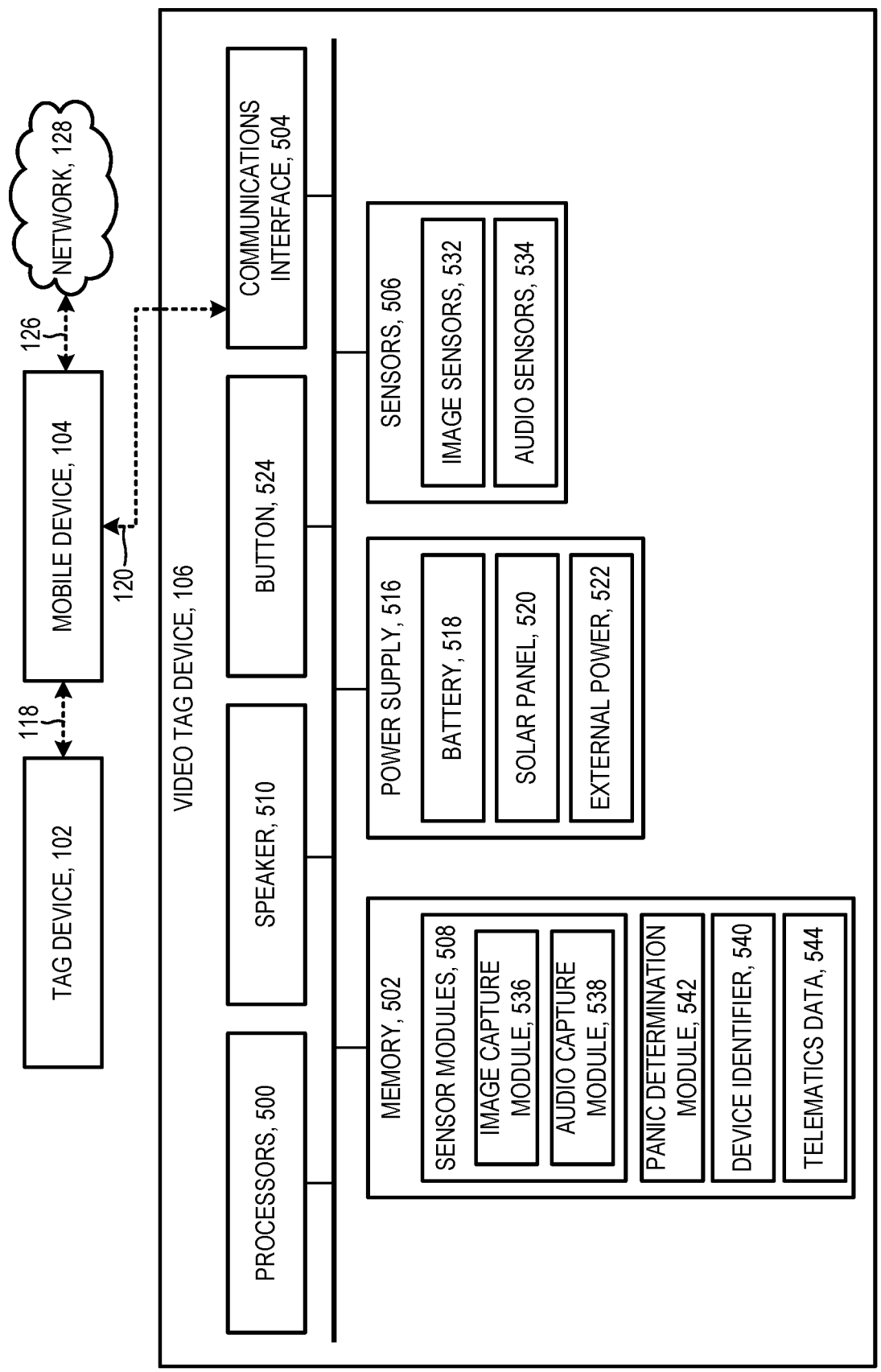
Figure 6A:
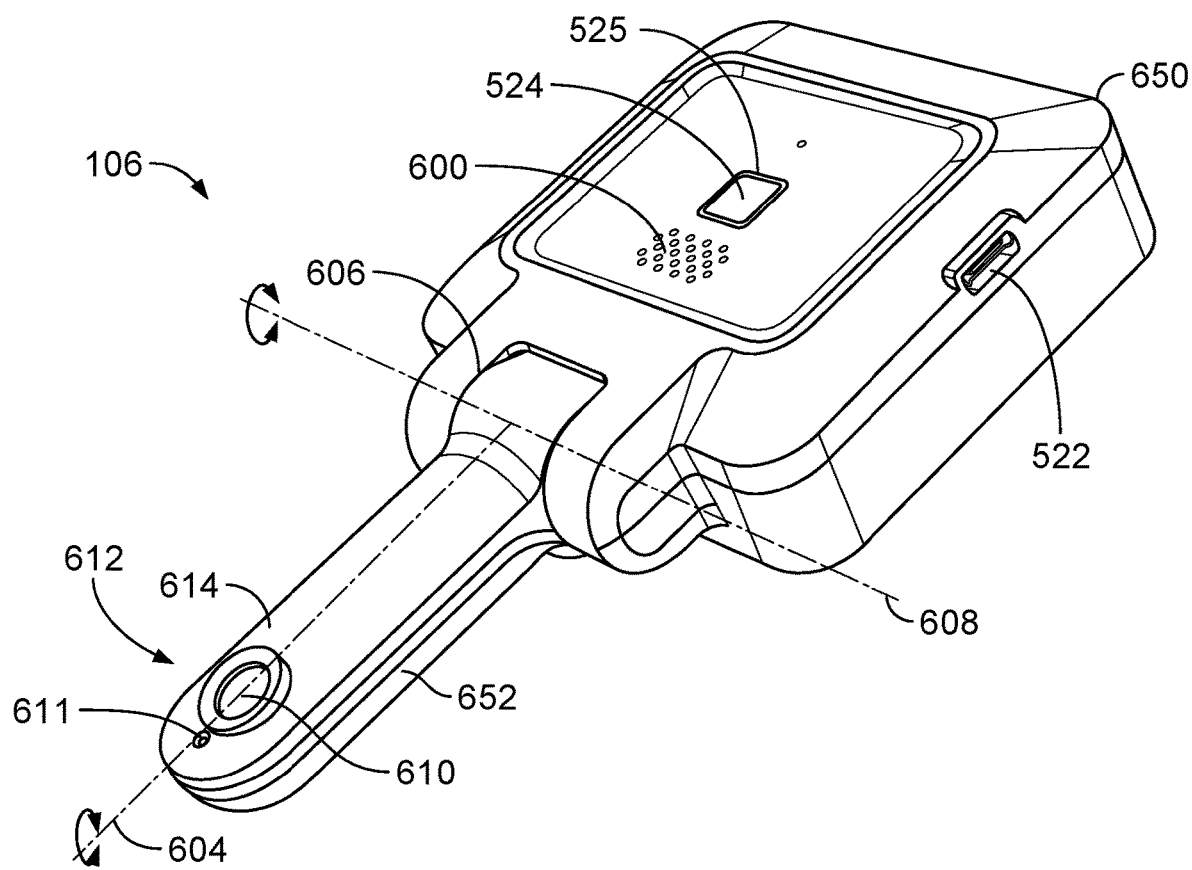
Figure 6B:
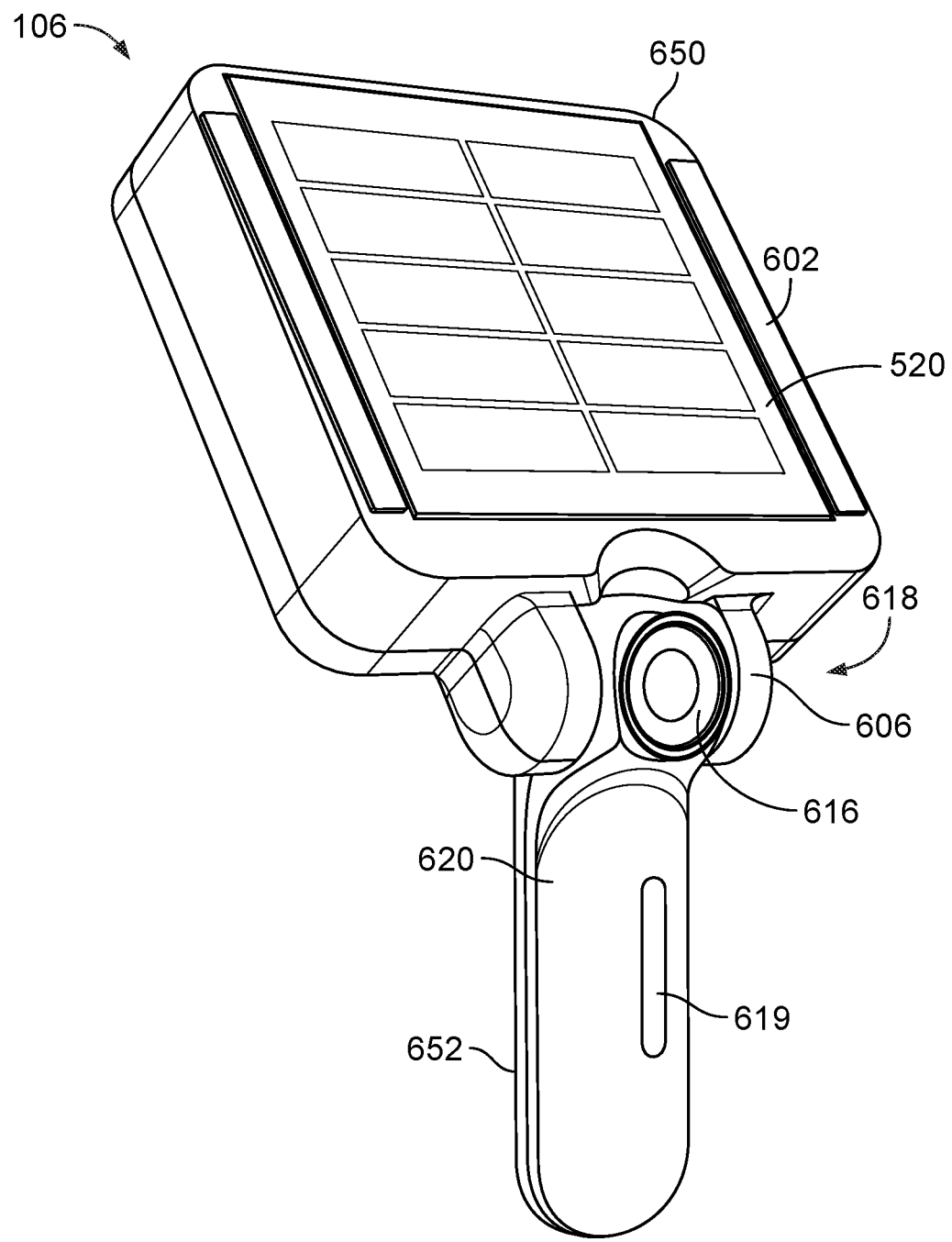
Figure 7A:
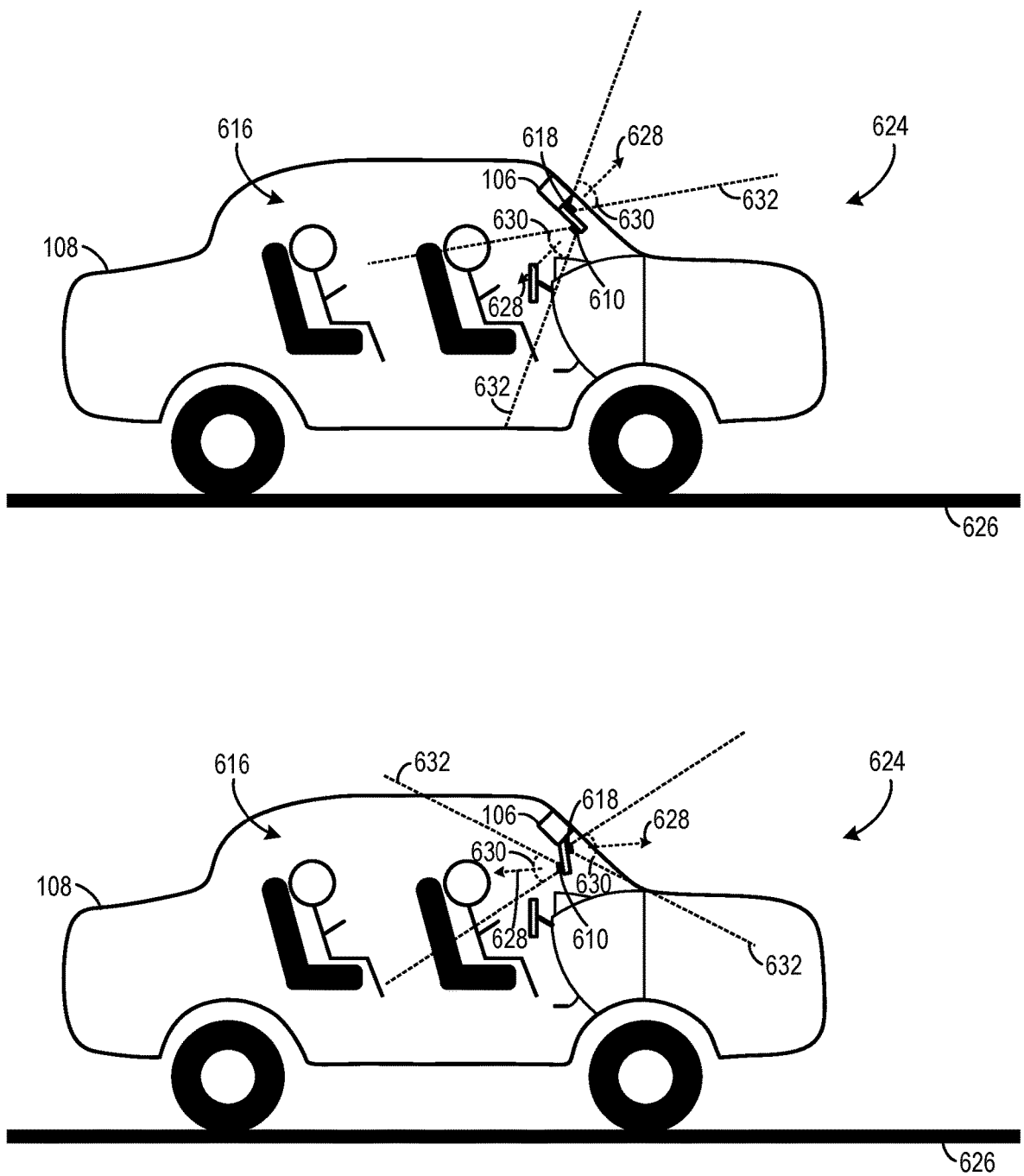
Figure 8:
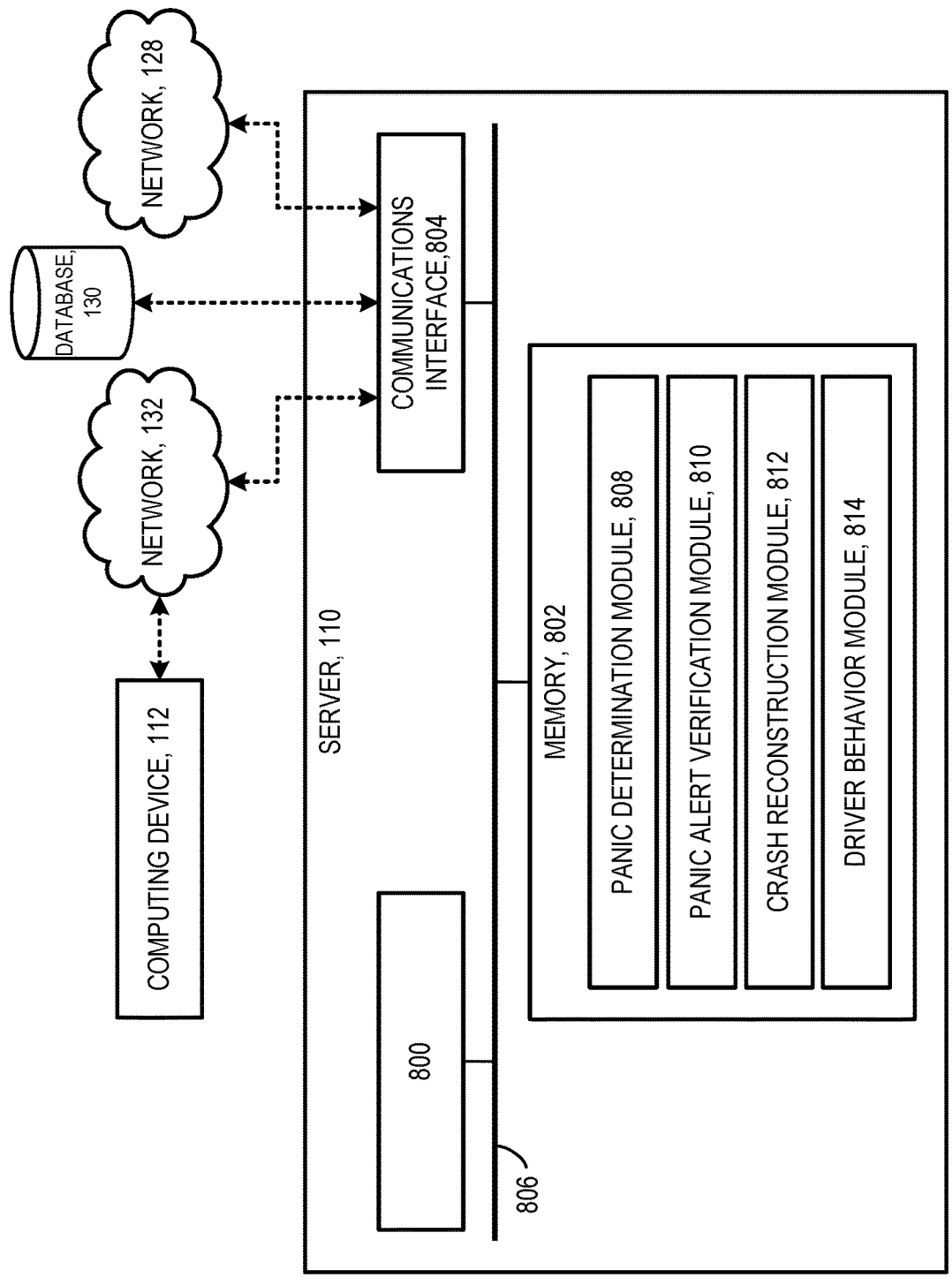
Figure 9A:
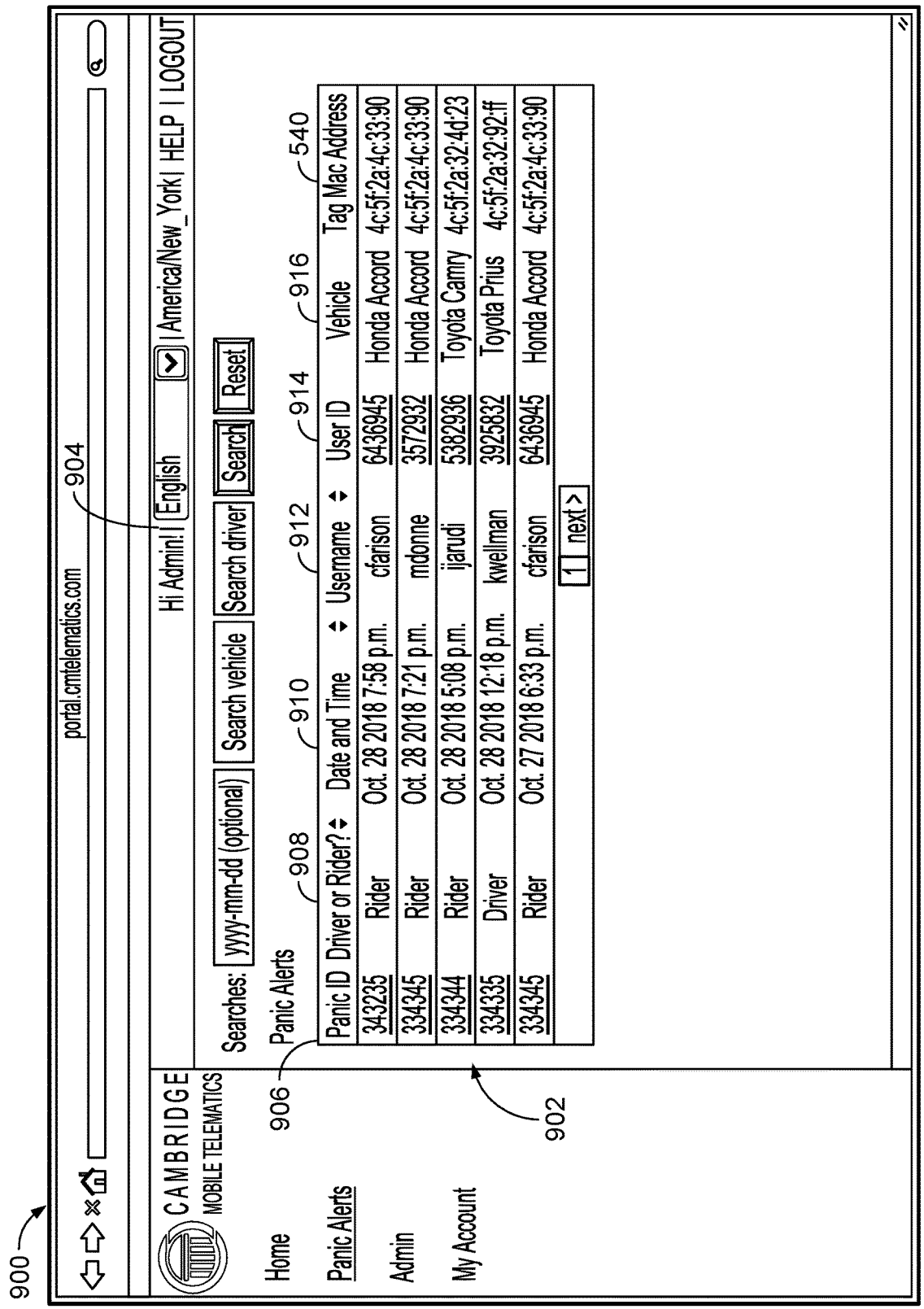
Figure 9B:
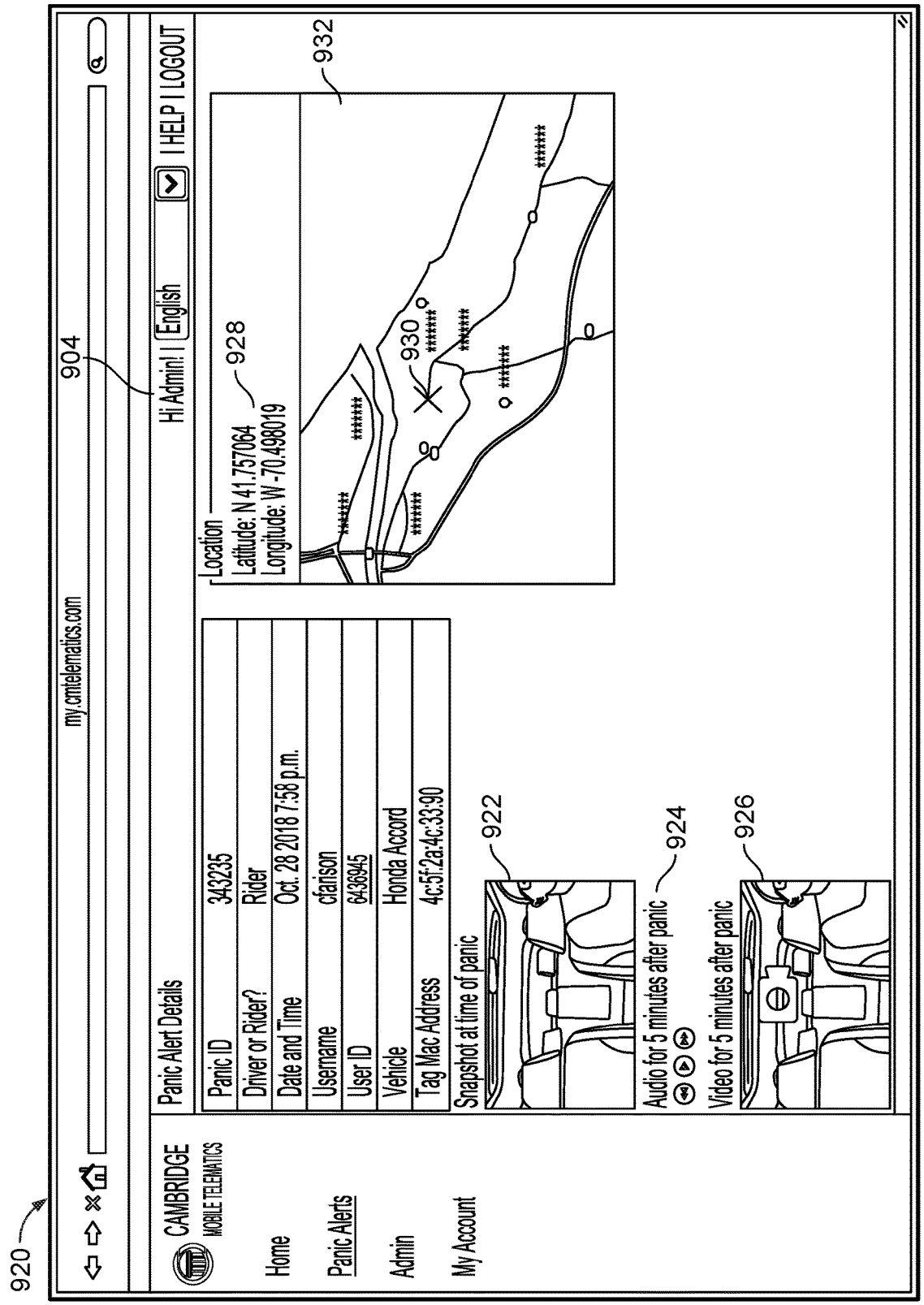
Figure 10:
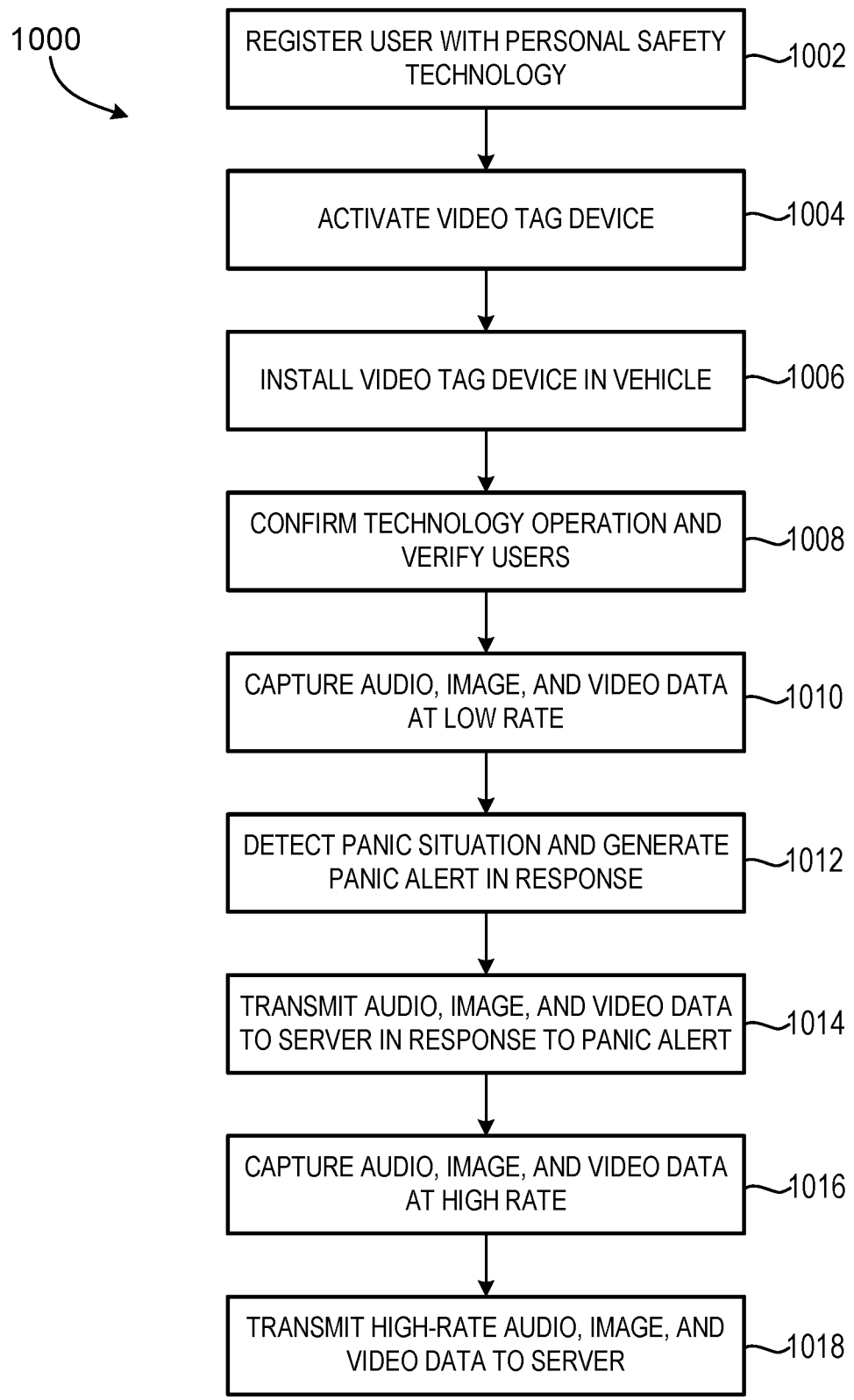

FIGS. 1a and 1b are schematic diagrams.
FIGS. 2 and 3 are block diagrams.
FIG. 4 is a user interface.
FIG. 5 is a block diagram.
FIGS. 6a and 6b are perspective views of a video tag device.
FIGS. 7a and 7b are schematic diagrams.
FIG. 8 is a block diagram.
FIGS. 9a and 9b are user interfaces.
FIG. 10 is a flow chart.
FIGS. 11 through 16 are user interfaces.

With the advent of sensor-equipped mobile devices and network-enabled telematics devices that can be placed in a vehicle, it is possible to use technology to monitor driving behavior and other information at the vehicle to recognize situations that put the safety of vehicle users at risk. Once recognized, notifications of these personal safety concerns can be provided to a third party, such as a call center or emergency services, to enable the third party to analyze the safety concerns and determine an appropriate response. Notifications can also be provided to vehicle users, such as a driver of the vehicle, to motivate the driver to reduce risky driving behaviors and make roads safer.

The growth of ridesharing poses additional safety concerns for vehicle users due to, for example, the increased risk of physical attacks within the vehicle. Accordingly, it is possible to use technology to monitor and recognize safety concerns of both drivers and passengers at the vehicle. In some instances, recognition of these and other personal safety concerns can be improved through analysis of audio, image, or video data captured at the vehicle. Audio, image, or video data captured at the vehicle can also serve as evidence of personal safety concerns.

In some implementations, the technology described here (which we sometimes call a "vehicle user safety technology" or simply the "safety technology" or the "technology") enables personal safety concerns for users of vehicles to be indicated, identified, communicated, analyzed, or acted on (or combinations of them) to enhance the safety of vehicle users by, for example, making the users and other participants in the technology aware of the safety concerns and reducing the risks to the users associated with the safety concerns, among others.

We use the term "personal safety concern" broadly to include, for example, any situation, event, occurrence, context, or scenario, in which the personal safety, such as the physical safety, of a user of a vehicle is compromised or potentially compromised. In some examples, the safety concern can rise to the level of panic; we sometimes use the word panic in our description to refer to such heightened safety concerns. Generally we use the term "panic" broadly also to refer to and be interchangeable with the phrase "safety concern."

To recognize personal safety concerns, each vehicle in the technology can include one or more telematics devices configured to capture telematics data at the vehicle. The captured telematics data can be interpreted or analyzed to recognize personal safety concerns forewarned by, based on, or associated with safety concern triggers. We use the term "safety concern trigger" to include, for example, any occurrence, cause, source, root, or origin suggesting, identifying, indicating, alarming, or signaling a hazard, danger, or other safety concern. In some examples, we use the term "panic triggers" to refer to specific triggers of heightened safety concern and more broadly and interchangeably with "safety concern trigger." Safety concern triggers can be explicitly indicated by users of vehicles (such as by pushing a panic button) or can be indicated or inferred in a variety of other ways, including by analysis, interpretation, and inference from telematics data and other information associated with the safety concern. In some examples, safety concern triggers can include activation of a physical panic button, activation of a software panic button, a voiced utterance or command, a loud noise, an impact, a crash, a violation by the vehicle of a geographical boundary, distracted driving, an inertial event, a road hazard, close proximity of the vehicle to another vehicle or object, incapacity of a driver or occupant of the vehicle, a detection of a physical altercation in the vehicle, a detection that one or more safety components were tampered with, and combinations of them.

Once recognized, the personal safety concerns can be reported to the users and other participants in the technology by safety alerts. We use the term "safety alert" broadly to include, for example, any report, alarm, notification, or other indication of a personal safety concern. Safety alerts may be made to one or more of a driver, an occupant, or other user of a vehicle or to other participants. For instance, in some cases, the safety alert can notify a server of the safety concern, and the server can report the safety concern to the users or other participants in the technology, or both. By making the users and other participants in the technology aware of the safety concerns, the technology can deter personal safety violations by the users and can enable the users and other participants to respond to the safety concerns. In some cases, the safety alert can be silent or invisible, or in other respects unapparent to users of the vehicle during the safety concern to avoid escalating the safety concern.

In some implementations, the safety alert can prompt one or more telematics devices at the vehicle to capture, store, and transmit telematics data, including, for example, audio, image, and video data. The technology (for example, the server) can use the captured telematics data to verify the safety alert and the safety concern to prevent or reduce false positives. In some cases, the technology (for example, the server) can present the captured data to a third party as evidence of the safety concern. In this way, the technology can enable the third party to analyze the safety concern and determine an appropriate action or response. Other activities can be performed based on a safety alert.

We use the term "vehicle" broadly to include, for example, any kind of ground conveyance such as a car, truck, bus, bicycle, motorcycle, or recreational vehicle, among others.

We use the term "participant" broadly to include, for example, any party that owns, uses, hosts, or participates in the technology, including drivers, passengers, or other occupants or users of vehicles, or third parties such as government agencies, insurance adjusters, ridesharing companies, emergency services, call centers, analysts, researchers, and hosts of the technology, and combinations of them.

We use the term "user" broadly to include, for example, a driver, passenger, or other occupant of a vehicle, or a person who is to become or has recently been an occupant of the vehicle.

We use the term "telematics data" broadly to include, for example, any kind of numerical or other information about vehicle motion, vehicle state, occupant state or behavior, or other information indicative of, associated with, produced by, or caused by a personal safety concern. Telematics data is typically captured at the vehicle at or by a source device and can be communicated by wire or wirelessly to another device at the vehicle or directly or indirectly to another device remote from the vehicle. Telematics data can include raw telematics data and derived telematics data. In some cases, telematics data includes information captured at the vehicle and processed or analyzed at the vehicle to derive other telematics data, such as derived telematics data or summary telematics data.

We use the term "raw telematics data" broadly to include, for example, signals, parameter values, and other outputs of sensors and other original sources of information.

FIGS. 1a and 1b illustrate a safety technology 100. Generally, the safety technology 100 can include a variety of components and devices that cooperate to perform the activities and functions described here. Each of the components and devices can include one or more hardware components, software applications, and data communication channels for communicating data between the hardware components and software applications of devices that are part of the technology. Some of the components and devices may be implemented as computer-readable storage mediums containing computer-readable instructions for execution by one or more processors within the technology 100. The technology 100 shown in FIG. 1 may include additional, fewer, or alternate components, including those discussed above and below.

As shown in FIGS. 1a and 1b, the safety technology 100 can include one or more telematics devices 101, such as one or more tag devices 102 or video tag devices 106, or combinations of them, among others, and one or more mobile devices 104 in or at each of one or more vehicles 108. The technology 100 can also include one or more servers 110 and one or more computing devices 112, each of which may be at a location remote from the vehicles 108.

Each of the telematics devices 101 and the mobile devices 104 can detect, process, and generate telematics data associated with a particular vehicle 108 (or can transmit raw or other telematics data among one another or to the servers 110 to process and generate the telematics data associated with the vehicle). The telematics data can be processed and analyzed, for example, by the telematics devices 101, the mobile devices 104, or the servers 110, or combinations of them, to identify a safety concern associated with a user of the vehicle 108, such as a driver 150 or a passenger 152 in or at the vehicle. Once identified, the safety concern can be reported, for example, through a safety alert communicated to users of the vehicle 108, such as the driver 150 or the passenger 152 in or at the vehicle, and to other participants in the technology 100, such as an administrator of the servers 110 or a trusted third party, including a government agency, an insurance adjuster, a ridesharing company, an analyst, a researcher, or combinations of them, among others, accessing the technology 100 through the computing devices 112. In some implementations, the safety alert prompts one or more of the telematics devices 101 and the mobile devices 104 at the vehicle 108 to capture, store, and transmit additional telematics data, including, for example, one or more of audio, image, or video data, or combinations of them. The technology 100, such as the server 110, can use the additional telematics data to, for example, verify the safety concern and can present the telematics data to one or more third parties accessing the technology through the computing devices 112 to enable the third party to verify the safety concern and determine an appropriate response or action.

The following use cases provide non-limiting examples of the technology 100 when deployed in a ridesharing context:

Rider attacked during ride:
1. Rider requests ride within the rideshare application running on the rider's mobile device.
2. Driver accepts the ride using the rideshare application running on the driver's mobile device and the driver drives to rider's location.
3. Rideshare application running on rider's mobile device confirms the vehicle is that of the driver who accepted the ride (by verifying the device identifier).
4. The video tag device takes snapshot image of backseat of the vehicle using, for example, an inward-facing camera, and sends the image over a Bluetooth or Wi-Fi network to a rideshare application running on the rider's mobile device so that the rider can confirm that the technology is working.
5. The video tag device begins recording audio and video at a low rate, and stores a buffer of these streams. The video tag device takes snapshot image of the interior of the vehicle and sends to rider's mobile device.
6. During the trip the rider determines that he or she is in danger and triggers panic alert by activating a physical button on a tag device in the vehicle or by activating a software button in the rideshare application on the rider's mobile device.
7. A panic alert message is sent to the server and then onto the computing device, which may be a rideshare company's call center.
8. The video tag device begins recording high-rate audio, image, and video data and saves the recording locally.
9. Audio data and a snapshot image are sent to the rider's mobile device (the user who triggered the panic alert), the server, and the rideshare company's call center for confirmation of the panic alert.
10. High-rate audio, image, and video data is sent via Wi-Fi to the rider's mobile device after 5 minutes of recording. The rider's mobile device forwards the data to the server.
11. The rider's mobile device may be taken and turned off during the attack, but after panic button is triggered.

Rider driven off-route and attacked:
1. Rider requests ride within the rideshare application running on the rider's mobile device.
2. Driver accepts the ride using the rideshare application running on the driver's mobile device and the driver drives to rider's location.
3. Rideshare application running on rider's mobile device confirms the vehicle is that of the driver who accepted the ride (by verifying the device identifier).
4. The video tag device takes snapshot image of backseat of the vehicle using, for example, an inward-facing camera, and sends the image over a Bluetooth or Wi-Fi network to a rideshare application running on the rider's mobile device so that the rider can confirm that the technology is working.
5. The video tag device begins recording audio and video at a low rate, and stores a buffer of these streams. The video tag device takes snapshot image of the interior of the vehicle and sends to rider's mobile device.
6. Rider is driven off-route, but their alertness is impaired (asleep/intoxicated) so they cannot activate the panic alert button.
7. Rideshare application running on driver's mobile device detects that that vehicle is going off-route via geo-fencing features and triggers a panic alert.
8. Panic alert message is sent to the server and to the rideshare company's call center.
9. The video tag device begins recording high-rate audio, image, and video data and saves the data locally.
10. Audio data and a snapshot image are sent to the rider's mobile device (the user who triggered the panic alert), the server, and the rideshare company's call center for confirmation of the panic alert.
11. High-rate audio, image, and video data is sent via Wi-Fi to the rider's mobile device after 5 minutes of recording. The rider's mobile device forwards the data to the server.
12. The rider's mobile device may be taken and turned off during the attack, but after panic button is triggered.

To produce the telematics data used to identify one or more safety concerns at the vehicle 108, each telematics device 101 can include sensors 160 to detect and measure raw telematics data at the vehicle 108 and sensor modules 162 to process, for example, the raw telematics data to generate telematics data associated with the vehicle 108. We use the term "module" broadly to include, for example, any code, program, firmware, software object, or other software device or arrangement that can be executed by a processor to perform one or more activities, functions, or facilities.

Generally, each telematics device 101 may include any number of sensors 160 and sensor modules 162 to detect, measure, and process telematics data related to a state of a vehicle or a state or behavior of a user of the vehicle, or a combination of them, such as one or more accelerometers, magnetometers, gyroscopes, inertial measurement units (IMUs), speed sensors, position sensors, such as a Global Positioning System (GPS), barometric sensors, weight sensors, engine sensors, alternator sensors, vibration sensors, voltage sensors, oxygen sensors, biometric sensors, electronic control unit (ECU) devices, image sensors, or audio sensors, or combinations of them, among others. Each telematics device 101 can also include memory 164 and one or more processors 166 to process and store data, such as the telematics data, in the memory 164, as well as a communications interface 168 to enable wired or wireless communications with other components or devices of the technology 100, such as one or more other telematics devices 101, one or more mobile devices 104, or one or more servers 110 (or through a mobile device to the one or more telematics devices or servers).

In some cases, the telematics devices 101 may be or include an aftermarket telematics device connected, for example, through an On-Board Diagnostics (OBD) port 114 of the vehicle 108 or an OEM telematics device installed during manufacture of the vehicle 108. In some examples, the telematics devices 101 may be a tag device placed or affixed in (but not electrically connected to) the vehicle 108, such as tags of the kind described in U.S. patent application Ser. No. 14/529,812, entitled "System and Method for Obtaining Vehicle Telematics Data," filed Oct. 31, 2014 (in some implementations, marketed, for example, as the DriveWell Tag™ by Cambridge Mobile Telematics of Cambridge, Massachusetts) the entire contents of which are incorporated by reference. In some implementations, the telematics device 101 may include or be in the form of a mobile device, a wearable device, or another device that is portable, or combinations of them, and may not necessarily be a telematics device dedicated to a particular vehicle. The telematics devices 101 can be battery-powered, connected into the electrical system of the vehicle 108, or both. In some instances, the telematics devices 101 can be mounted in or on the vehicle, for example, in a location that is accessible to one or more occupants of the vehicle. In some cases, the telematics devices 101 can be untethered from the vehicle 108 such that it is moveable within or outside of the vehicle.

In some implementations, the telematics devices 101 may be or include one or more tag devices 102. Referring to FIG. 2, each tag device 102 can include sensors 200 to detect and measure raw telematics data at the vehicle 108 and sensor modules 202 to process, for example, the raw telematics data to generate telematics data associated with the vehicle 108. Generally, each tag device 102 may include any number of sensors 200 and sensor modules 202 to detect, measure, and process telematics data related to a state of a vehicle or a state or behavior of a user of the vehicle, or a combination of them, such as one or more accelerometers, magnetometers, gyroscopes, IMUs, speed sensors, position sensors, such as a GPS, barometric sensors, weight sensors, engine sensors, alternator sensors, vibration sensors, voltage sensors, oxygen sensors, biometric sensors, ECU devices, image sensors, or audio sensors, or combinations of them, among others. Each tag device 102 can also include memory 204 and one or more processors 206 to process and store data, such as the telematics data 212, in the memory 204, as well as a communications interface 208 to enable wired or wireless communications with other components or devices of the technology 100, such as one or more other telematics devices 101, one or more mobile devices 104, or one or more servers 110 (or through a mobile device to the one or more telematics devices or servers).

Each tag device 102 can store executable instructions associated with a panic determination module or other safety module 210 to detect or recognize one or more panic situations or other safety concerns. We use the term "panic determination module" or "safety concern determination module" broadly to include, for example, any code, program, firmware, software object, or other software device or arrangement, or combinations of them, that can be executed by one or more processors, integrated circuits, or other hardware devices included in the technology 100 to, among other things, process telematics data to detect a panic situation or other safety concern and to generate a panic alert or other safety alert in response. Generally, a panic determination module or safety concern determination module can be configured to detect one or any number of panic situations or types of panic situations or other safety concerns, including, for example, activation of a physical panic button, activation of a software panic button, a voiced utterance or command, a loud noise, an impact, a crash, a violation by the vehicle of a geographical boundary, distracted driving, an inertial event, a road hazard, close proximity of the vehicle to another vehicle or object, incapacity of a driver or occupant of the vehicle, a detection of a physical altercation in the vehicle, a detection that one or more safety components were tampered with, and combinations of them, among others. Although specific examples of panic determination modules or safety concern determination modules are described with reference to certain devices or components of the technology 100, the techniques described here can be applied to, by, or in any device or component of the technology 100, or any combination of components or devices, including, but not limited to, a telematics device 101, such as a tag device 102 or a video tag device 106, a mobile device 104, a server 110, and a computing device 112.

For instance, the panic determination module 210 can generate and process telematics data produced or otherwise obtained by the tag device 102 to detect or recognize a panic situation or other safety concern at the vehicle 108. After (or while) detecting or recognizing a panic situation, the panic determination module 210 can generate a panic alert or other safety alert to one or more devices in the safety technology 100, such as another telematics device 101, including the video tag device 106, the mobile device 104, or the server 110, or combinations of them. For example, in some cases, the tag device 102 can include a panic button 116 or other safety concern button, which may be a physical button included in the tag device, a physical button coupled to the tag device, a software button presented on a display included in the tag device, or a software button presented on a display of another device in the vehicle, or combinations of them. Activation of the panic button 116 can cause the panic determination module 210 executing on the tag device 102 to generate a panic alert or other safety alert to one or more other devices or components in the technology 100. The panic alert or other safety alert can be silent or invisible, or in other respects unapparent to occupants of the vehicle to avoid escalating the panic situation. For example, in some cases the panic alert or other safety alert does not cause any components in the technology 100 to generate an audible noise or visible indicator in response.

In some implementations, the safety technology 100 can include multiple tag devices 102 to provide multiple panic buttons 116 in the vehicle 108. In this way, the technology 100 can provide vehicle users with greater access to a panic button 116 should a user wish to indicate a panic situation or other safety concern. In some cases, the technology 100 can include a tag device 102 and panic button 116 for each occupant of the vehicle 108, such as a driver 150 and one or more passengers 152 of the vehicle. In some cases, the technology 100 can include a tag device 102 and a panic button 116 for each group of occupants of the vehicle 108, such as a group based on a role of the occupant (for example, a driver role or a passenger role), a group based on a location of the occupant in the vehicle (for example, a group of occupants seated in the front seats of the vehicle or a group of occupants seated in the rear seats of the vehicle), or combinations of them, among others. Each of the tag devices 102 can be placed or affixed in the vehicle such that the panic button 116 is accessible by the occupant (or group of occupants) while the occupant remains seated. Similarly, the panic button 116 can include one or more identifying markers, such as a LED indicator, a bright color, or a panic symbol, or combinations of them, among others, to allow the occupant to easily locate the button in a panic situation or in case of another safety concern.

The tag device 102 may communicate telematics data (which may be or include a panic alert) to other components or devices of the technology 100, including one or more other telematics devices 101, such as a video tag device 106, one or more mobile devices 104, or one or more servers 110 (or through a mobile device to the one or more telematics devices or servers). In some cases, the tag device 102 can include a unique device identifier 214 stored in the memory 204 and included in each communication with the other components or devices of the technology 100. The server 110 can store (for example, in a database 130) a mapping of the device identifier 214 for each tag device 102 to other user and vehicle information, such as a particular vehicle 108 associated with the tag device or a particular user of the technology 100 associated with the tag device, or both, among others. In this manner, the server 110 and the other devices and components of the technology 100 can associate the tag device 102 and its telematics data with a particular vehicle 108 or a particular user of the technology 100, or combinations of them, among others.

Referring to FIG. 3, the mobile device 104 may include hardware and software components, such as one or more processors 300, a memory 302, a communication interface 304, one or more sensors 306, one or more sensor modules 308, an application module 310, a display 314, and a panic determination module 316, among others. In some implementations, the mobile device 104 may be a portable computing device, such as a smartphone, a tablet computer, a laptop computer, a wearable computing device, or another mobile device or personal computing device, or combinations of them, brought into the vehicle 108 temporarily, for example, by an occupant of the vehicle. In some cases, the mobile device 104 may be or include an OEM or aftermarket device that is installed or otherwise affixed within the vehicle.

In some implementations, the mobile device 104 may establish communications with one or more components or devices in the technology 100, such as the telematics devices 101 and the servers 110. For example, in some cases a communication channel 118 may be established between the mobile device 104 and the tag device 102. In some cases, a communication channel 120 may be established between the mobile device 104 and the video tag device 106. Each of the communication channels 118 and 120 can be a wired or wireless communication channel, such as Bluetooth, Wi-Fi, cellular, Radio Frequency Identification (RFID), Near-Field Communication (NFC), or combinations of them, among others. In some cases, the mobile device 104 may establish a communication channel 126 with a network 128 to communicate with one or more servers 110 over the network. The network 128 may be the Internet, a cellular network, a Wi-Fi network, a local area network, a wide area network, a satellite network, or any other suitable data transmission network, or combinations of them. In this way, the mobile device 104 can send and receive telematics data (which may be or include a panic alert) to and from one or more components or devices in the technology 100, or otherwise facilitate communications among the components or devices, such as the telematics devices 101 and the servers 110, among others.

In some cases, the mobile device 104 can include a unique device identifier 318 stored in the memory 302 and included in each communication with the other components or devices of the technology 100. The server 110 can store (for example, in a database 130) a mapping of the device identifier 318 for each mobile device 104 to other user and vehicle information, such as a particular vehicle 108 associated with the mobile device and a particular user of the technology 100 associated with the mobile device, among others, and in some instances, can associate the mobile device with one or more of the telematics devices 101. In this manner, the server 110 and the other devices and components of the technology 100 can associate the mobile device 104 and its telematics data with a particular vehicle 108, a particular user of the technology 100, or a particular telematics device 101, or combinations of them, among others.

In some cases, the mobile device 104 can be configured to establish communications with any of the telematics devices 101 when the mobile device is present at the vehicle 108. In some cases, the mobile device 104 can be configured to establish communications with an associated telematics device 101 or set of associated telematics devices 101, such as the telematics devices 101 corresponding to a particular ridesharing company, based on, for example, a mapping or association of the telematics devices 101 and the mobile device 104 in the database 130, an identifier broadcast by the telematics device 101 and received by the mobile device 104, or combinations of them, among others. In some cases, encryption techniques can be used to prevent the mobile device 104 from establishing communications with or otherwise accessing the telematics data of non-associated telematics devices 101.

The mobile device 104 is not required to be present at the vehicle 102 at all times, however, because the telematics devices 101, including the tag device 102 and the video tag device 106, can collect and store data, such as the telematics data, in memory or other storage for later transfer to the mobile device 104 (and through the mobile device to one or more other telematics devices or servers) when the mobile device is present and communicatively coupled. Furthermore, although the telematics devices 101, such as the tag device 102 and the video tag device 106, are described as being separate from the mobile device 104, in some implementations the functions of the telematics devices 101 and the mobile device 104 are combined by, for example, using one or more sensors 306 and sensor modules 308 built into the mobile device 104, such as GPS, accelerometers, magnetometers, barometers, gyroscopes, IMUs, cameras, or microphones, among others. In this manner, the mobile device 104 can produce or otherwise obtain raw telematics data and can process the raw telematics data to generate telematics data associated with the vehicle 108 in place of or as a supplement to the raw and processed data obtained and generated by the telematics devices 101.

In some implementations, an application module 310 and a panic determination module 316 (an example of a safety determination module) executing on the mobile device 104 can cooperate to detect a panic situation or other safety concern at the vehicle 108 and can generate a panic alert or other safety alert in response. For example, the application module 310 can present a user interface 312 to a user through the display 314 of the mobile device 104. In some cases, the user interface 312 can include a software panic button 400 or other safety concern button, as shown in FIG. 4. When activated, the software panic button 400 can cause the panic determination module 316 executing on the mobile device 104 and in communication with the application module 310 to generate a panic alert or other safety alert to one or more devices or components in the technology 100.

In some implementations, the panic determination module 316 can generate and process telematics data produced by one or more sensors 306 and sensor modules 308 of the mobile device 104 (or telematics data received from another telematics device 101) to detect a panic situation or other safety concern at the vehicle. For example, in some cases, the panic determination module 316 can receive and process signals from an audio sensor 320, such as a microphone of the mobile device 104, to detect a predetermined voice command associated with a panic situation, such as "Help me!" or "Hey Google, panic alert." The voice command can be set in advance by a user of the mobile device 104, for example, by verbally or typographically inputting a desired command into the mobile device 104 to register the command with the panic determination module 316, the application module 310, or both. The detection of the voice command can cause the panic determination module 316 to generate a panic alert to one or more devices or components in the technology 100, such as the telematics devices 101 and the servers 110.

In some cases, the panic determination module 316 can process the audio signals from the audio sensor 320 to detect a noise in the vehicle 108 that exceeds a predetermined noise threshold, such as a noise greater than about 100 decibels (dB), a noise greater than about 105 dB, a noise greater than about 110 dB, or another noise level associated with a human scream or other commotion within the vehicle 108. In response to detecting a noise that exceeds a predetermined noise threshold, the panic determination module 316 can generate a panic alert to one or more devices or components in the technology 100, such as the telematics devices 101 and the servers 110.

In some cases, the panic determination module 316 can process signals from a position sensor 322, such as a GPS of the mobile device 104, to determine a geographical position of the vehicle 108. If the vehicle 108 is outside a predetermined geographical boundary, such as a boundary defined relative to a preselected route of the safety technology 100, then the panic determination module 316 can generate a panic alert to one or more devices or components in the technology 100. For example, in some cases, a participant of the technology 100, such as a driver 150, a passenger 152, or a third party operating on a computing device 112, among others, can select a destination for the vehicle 108. One or more components or devices of the technology 100 can then generate a route to navigate the vehicle 108 or a driver of the vehicle to the selected destination. The one or more components or devices can generate a geographical boundary or "geo-fence" at a predefined radius, such as a quarter mile, around each point along the route. In some cases, the geographical boundary can be generated dynamically to, for example, account for changes in the route. In some cases, the radius of the geographical boundary can be increased or decreased at one or more points along the route, for example, to account for traffic density, street density, land use zoning, a speed of the vehicle 108, or combinations of them, among others. If the panic determination module 316 determines, for example, based on the signals from the position sensor 322, that the vehicle 108 is outside the geographical boundary, then a panic alert can be generated and transmitted to one or more devices or components in the technology 100.

In some cases, the panic determination module 316 can process signals from one or more motion sensors 324 or device state sensors 326 of the mobile device 104, or both, to determine if the driver of the vehicle 108 is using the mobile device 104 while driving. For example, the panic determination module 316 can process signals from the one or more motion sensors 324, such as an accelerometer, a magnetometer, a gyroscope, an IMU, a barometer, or a compass, or combinations of them, to determine, for example, a speed of the vehicle 108. If the speed of the vehicle 108 is greater than zero, the panic determination module 316 can determine that the vehicle is in motion. The panic determination module 316 can determine whether the mobile device 104 is in use by the driver, for example, by processing the signals from the one or more motion sensors 324 to detect motion, such as the speed, velocity, or acceleration, of the mobile device 104. If the motion of the mobile device 104 is inconsistent with the motion of the vehicle 108, then the panic determination module 316 can determine that the mobile device 104 is in use. In some cases, the panic determination module 316 can process signals from the one or more device state sensors 326 to determine whether the mobile device 104 is in use, for example, by detecting that the screen of the mobile device is in an on state, by detecting that the mobile device is not in a lock state, by detecting that the mobile device is in a call state (including a hands-free and a non-hands-free call state), by detecting tapping or swiping on the mobile device, or combinations of them, among others. If the driver's mobile device 104 is determined to be in use while the vehicle 108 is in motion, then the panic determination module 316 can infer that the driver is distracted and can generate a panic alert.

After receiving, generating, or processing telematics data associated with the vehicle 108, the mobile device 104 can, in some implementations, store the telematics data 328 in memory 302 or transmit the telematics data to one or more other components or devices in the technology 100, including the telematics devices 101, such as the tag device 102 or the video tag device 106, and the servers 110, or combinations of them. In some examples, the mobile device 104 can transmit raw telematics data to the other components or devices for processing. In some cases, the mobile device 104 can be configured to transmit only a subset of the telematics data, such as the panic alert or other safety alert, to the other components or devices, such as one or more of the telematics devices 101.

In some implementations, the technology 100 can include a single video tag device 106 within the vehicle 108, and the mobile device 104 of each occupant of the vehicle, such as the driver 150 and one or more passengers 152, may establish a communication channel 120 with the same video tag device 106. In this way, one or more occupants of the vehicle 108 can be participants in use of the same video tag device 106 and other components and devices of the safety technology 100, and the video tag device 106 can collect and process telematics data that is common to each occupant of the vehicle 108. In some cases, the common telematics data produced by the video tag device 106 can be shared with some or all of the occupants of the vehicle 108, for example, by transmitting the data to the mobile device 104 of each occupant or by causing the server 110 to present the data to each occupant. In some implementations, the common telematics data can be used by one or more components or devices of the technology 100 to make a collective determination regarding the safety of each occupant, such as a determination of regarding the existence of a safety concern for each occupant, a determination regarding the veracity of the safety concern for each occupant, or both, as discussed below.

Referring to FIG. 5, the video tag device 106 can include hardware and software components, such as one or more processors 500, a memory 502, a communication interface 504, one or more sensors 506 and sensor modules 508, and a speaker 510, among others. The video tag device 106 can also include a power supply 516, such as one or more batteries 518, solar panels 520, or external power ports and circuitry 522, or combinations of them, to provide power to the various components in the device. In some cases, the video tag device 106 can include a multi-purpose button 524 to, for example, power the video tag device 106 on or off, activate the video tag device 106 as discussed below, and enable pairing, such as Bluetooth pairing, with the device, among others.

The sensors 508 of the video tag device 106 can include one or more image sensors 532, such as a camera 122, and audio sensors 534, such as a microphone 124, to detect and measure image and audio signals at the vehicle 108. The image sensors 532 and audio sensors 534 can be coupled with a corresponding image capture module 536 and an audio capture module 538 to capture the image and audio signals at the vehicle 108 and process the signals to generate image and audio data. In some cases, the image capture module 536 can combine a sequence of image signals from one or more of the image sensors 532 to produce video signals and data at the vehicle 108. Generally, the video tag device 106 may include any number of sensors 506 and sensor modules 508 to provide signals and data related to a state of a vehicle or a state or behavior of a user of the vehicle, or both, such as one or more one or more accelerometers, magnetometers, gyroscopes, IMUS, speed sensors, position sensors, such as a GPS, barometric sensors, weight sensors, engine sensors, alternator sensors, vibration sensors, voltage sensors, oxygen sensors, biometric sensors, ECU devices, image sensors, or audio sensors, or combinations of them, among others.

In some cases, the video tag device 106 can include a unique device identifier 540 stored in the memory 502 and included in each communication with the other components or devices of the technology 100. In some cases, the device identifier 540 can be a media access control (MAC) address of the video tag device 106. The server 110 can receive the device identifier 538 during, for example, activation of the video tag device, as discussed below. Once received, the server 110 can store (for example, in a database 130) a mapping of the device identifier 540 for each video tag device 106 to other user and vehicle information, such as a particular vehicle 108 associated with the video tag device and a particular user of the technology 100 associated with the video tag device, among others, and in some instances, can associate the video tag device with one or more of the telematics devices 101 or the mobile devices 104. In this manner, the server 110 and the other devices and components of the technology 100 can associate the video tag device 106 and its telematics data with a particular vehicle 108, a particular user of the technology 100, a particular telematics device 101, or a particular mobile device 104, or combinations of them, among others.

As shown in FIG. 5, the video tag device 106 can store executable instructions associated with a panic determination module 542 (an example of a safety determination module) in the memory 502. In some implementations, the panic determination module 542 can process telematics data produced by one or more of the sensors 506 and sensor modules 508 of the video tag device 106 (or telematics data received from another telematics device 101 or a mobile device 104) to detect a panic situation at the vehicle 108 and to generate a panic alert or other safety alert in response. Generally, the panic determination module 542 can detect one or any number of panic situations or types of panic situations or other safety concerns, including, for example, activation of a physical panic button, activation of a software panic button, a voiced utterance or command, a loud noise, an impact, a crash, a violation by the vehicle of a geographical boundary, distracted driving, an inertial event, a road hazard, close proximity of the vehicle to another vehicle or object, incapacity of a driver or occupant of the vehicle, a detection of a physical altercation in the vehicle, a detection that one or more safety components were tampered with, and combinations of them, among others. In each case, the panic determination module 542 can process the panic alert or other safety alert locally within the video tag device 106, as discussed below. For example, in response to the alert, the panic determination module 542 can cause the video tag device 106 to capture, store, and transmit telematics data, such as audio, image, and video data, or to adjust one or more telematics data collection properties, such as the rate or resolution of data capture, or both. The panic determination module 542 can store and transmit the alert to one or more devices or components in the technology 100, such as the mobile device 104 and the server 110, among others.

In some cases, the panic determination module 542 can receive and process signals from one or more audio sensors 534, such as the microphone 124, to detect a predetermined voice command associated with a panic situation and can generate a panic alert or other safety alert in response. For instance, the panic determination module 542 can store a signal, such as an audio signal, associated with the predetermined voice command, such as "Help me!" or "Hey Google, panic alert." The predetermined voice command and its corresponding signal can be preinstalled in the video tag device 106, or can be set in advance by a user of the video tag device, for example, by verbally inputting the voice command to the device. In some cases, the video tag device 106 can receive one or more predetermined voice commands (and signals) from a mobile device 104 when the two devices are communicatively coupled. To detect a voice command, the panic determination module 542 can compare the signal associated with the predetermined voice command with the signals from the audio sensors 534 to detect patterns or signatures in the signals from the audio sensors that match patterns or signatures in the predetermined voice command signal. If a match or a substantial match is found, the panic determination module 542 can determine that the voice command was uttered within the vehicle 108 and can generate a panic alert.

In some cases, audio signals from the one or more audio sensors 534, such as the microphone 124, can be processed by the panic determination module 542 to detect a noise in the vehicle 108 that exceeds a predetermined noise threshold, such as a noise greater than about 100 decibels (dB), a noise greater than about 105 dB, a noise greater than about 110 dB, or another noise level associated with a human scream or other commotion within the vehicle 108. The panic determination module 542 can generate a panic alert in response to detecting a noise that exceeds a predetermined noise threshold.

In some cases, the panic determination module 542 can process signals from a position sensor, such as GPS of the video tag device 106 or another device, to determine a geographical position of the vehicle 108. If the vehicle 108 is outside a predetermined geographical boundary, such as a boundary defined relative to a preselected route of the vehicle 108, then the panic determination module 542 can generate a panic alert or other safety alert. For example, in some cases, a participant of the technology 100, such as a driver 150, a passenger 152, or a third party operating on a computing device 112, among others, can select a destination for the vehicle 108. One or more components or devices of the technology 100 can then generate a route to navigate the vehicle 108 or a driver of the vehicle to the selected destination. The one or more components or devices can generate a geographical boundary or "geo-fence" at a predefined radius, such as a quarter mile, around each point along the route. In some cases, the geographical boundary can be generated dynamically to, for example, account for changes in the route. In some cases, the radius of the geographical boundary can be increased or decreased at one or more points along the route, for example, to account for traffic density, street density, land use zoning, a speed of the vehicle 108, or combinations of them, among others. If the panic determination module 542 determines, for example, based on the signals from a position sensor, that the vehicle 108 is outside the geographical boundary, then a panic alert can be generated.

In some cases, the panic determination module 542 can process signals from one or more of the image sensors 532, the audio sensors 534, and other sensors 506 to detect a crash of the vehicle 108 or an impact associated with the vehicle 108, and can generate a panic alert in response to the crash or impact. For example, the panic determination module 542 can use process signals from the image sensors 532 to detect one or more images of the vehicle 108 impacted with another vehicle or object, an image of the vehicle rolling over or otherwise tipping on its side or roof, or an image of the vehicle facing the wrong direction in the road, or combinations of them, among others. In some cases, the panic determination module 542 can compare one or more successive images to detect new damage to the vehicle to infer that the vehicle was involved in a crash or impact. The panic determination module 542 can analyze audio signals from the audio sensors 534 to detect patterns or signatures in the signals, such as those associated with glass shattering, tires skidding, or plastic or steel deforming, among others, that are indicative of a vehicle crash or impact. Similarly, in some cases, the panic determination module 542 can process signals from one or more sensors 506 to detect inertial signatures indicative of a crash, impact, or other inertial event at the vehicle 108, such as braking, accelerating, cornering, swerving, or drifting of the vehicle 108, and can generate a panic alert if the inertial signature is indicative of a crash or if the magnitude of the inertial event exceeds a predetermined threshold.

In some cases, the panic determination module 542 can process signals from one or more sensors 506 to detect whether the vehicle 108 is in close proximity to another vehicle or is traveling toward an object in the road. For example, in some implementations, the video tag device 106 can include an outward-facing camera positioned to capture images of an area exterior to the vehicle, such as the road, and the panic determination module 542 can analyze the image data produced by the outward-facing camera to detect that the vehicle 108 is in close proximity to another vehicle or is traveling toward an object in the road, and can generate a panic alert in response.

In some cases, the panic determination module 542 can process signals from one or more of the image sensors 532, the audio sensors 534, and one or more other sensors 506, such as a position sensor and an accelerometer, to detect whether the vehicle 108 is in a high-risk area of the road, such as a dangerous intersection, or has left the main area of the road, such as by driving onto a shoulder of the road or driving off the road. For example, the panic determination module 542 can detect a stop of the vehicle 108 for a certain period of time at a position associated with a dangerous intersection followed by an acceleration of the vehicle to infer that the vehicle is at a dangerous intersection, and can generate a panic alert in response. In some implementations, the panic determination module 542 can process image signals from an outward-facing camera to determine whether the vehicle 108 is at an intersection or another high-risk area of the road, and can generate a panic alert. In some cases, the panic determination module 542 can process image signals, audio signals, or other sensors signals, to determine whether the vehicle 108 is on a shoulder of the road or has driven off the road, and can generate a panic alert.

In some cases, the panic determination module 542 can process signals from one or more sensors 506, such as image signals of an interior of the vehicle captured by the camera 122, to detect whether an occupant of the vehicle 108 is incapacitated, for example, by analyzing the head pose of the occupant, the body posture of the occupant, or determining whether the occupant's eyes are open, among others, and can generate a panic alert in response. Similarly, the panic determination module 542 can use image data from the camera 122 to determine if the driver of the vehicle 108 is distracted while driving, such as by analyzing the head pose, the body posture, and the eyes of the driver, and can generate a panic alert in response.

In some cases, one or more of the components or devices of the technology 100, such as the telematics devices 101 or the mobile device 104, can include tamper resistance features. Because tampering can undermine the safety features provided by the technology 100, the components and devices in the technology can be configured to detect tampering and can generate a panic alert in response. For example, in some cases, the panic determination module 542 can process image signals from the image sensors 532 to detect whether the camera is covered or otherwise obfuscated, and can generate a panic alert in response. In some cases, the panic determination module 542 can detect whether the mobile device 104 or another telematics device 101, or both, is turned off or otherwise disabled during use, for example by detecting a disconnection of the device, and can generate a panic alert in response. Similarly, in some cases the mobile device 104 or another telematics device 101, or both, can detect (for example, through a panic determination module 210 or 316) whether the video tag device 106 is turned off or otherwise disabled during use and can generate a panic alert in response. In some implementations, one or more of the telematics devices 101 and the mobile devices 104 can include a sensor or switch that is activated upon physical tampering with the device, and the device can generate a panic alert in response. In some implementations, the panic determination modules 210, 316, and 542 can include a software mechanism, such as code, firmware, or another software object, that can detect whether the software executing on the device has been altered, and can generate a panic alert in response.

In some implementations, the panic determination module 542 can process panic alerts or other safety alerts generated locally within the video tag device 106 or received from another telematics device 101, a mobile device 104, or a server 110, or a combination of them. In some cases, the panic determination module 542 can cause the video tag device 106 to store the panic alert and transmit the panic alert to another telematics device 101, the mobile device 104, or the server 110, or combinations of them. In some cases, the panic determination module 542 can cause the video tag device 106 to capture, store (for example, as telematics data 544 in the memory 502), and transmit telematics parameters and telematics data, such as audio, image, and video data, in response to the panic alert or other safety alert. For example, in some implementations, the video tag device 106 can capture one or more snapshot images of the interior or exterior or both of the vehicle 108 in response to the alert, and can transmit the snapshot images, along with previously recorded audio data or other telematics data, to another telematics device 101, the mobile device 104, or the server 110, or combinations of them, in real time or upon request. The video tag device 106 can continue capturing and storing audio, image, and video data at the vehicle 108 for a predetermined period of time, such as 5 minutes, after receiving the alert, and can transmit the audio, image, and video data to another telematics device 101, the mobile device 104, or the server 110 in real time, after the predetermined period of time expires, or in response to a request from the mobile device 104 or the server 110, among others.

The panic determination module 542 can cause the video tag device 106 to adjust one or more telematics data capture properties, such as the rate or resolution of data capture, in response to the received panic alert or other safety alert. For example, in some cases, the panic determination module 542 can provide one or more signals (for example, using the one or more processors 500) to the audio sensors 532 or the audio capture module 536, or both, to cause the video tag device 106 to record high rate audio signals and data, such as audio sampled at about 8 kHz or greater, at about 11 kHz or greater, at about 16 kHz or greater, at about 22 kHz or greater, at about 32 kHz or greater, or at about 44 kHz or greater, in response to the panic alert or other safety alert. In some cases, the panic determination module 542 can provide one or more signals to the image sensors 530 or the image capture module 534, or both, to cause the video tag device 106 to record high rate video signals and data, such as video sampled at about 15 Hz (15 frames per second (fps)) or greater or about 30 Hz (30 fps) or greater, for the predetermined period of time after receiving the panic alert or other safety alert. The panic determination module 542 can provide one or more signals to others sensors 506 or sensor modules 508, or both, to adjust other telematics data capture properties in response to the panic alert or other safety alert. Although processing panic alerts and other safety alerts is described with reference to the video tag device 106 and the panic determination module 542, the techniques described here can be applied to, by, or in any device or component of the technology 100, or any combination of components or devices, including, but not limited to, another telematics device 101, such as the tag device 102, a mobile device 104, a server 110, and a computing device 112.

FIGS. 6a and 6b are front and back perspective views of a video tag device 106. The video tag device 106 includes a housing 650 which can contain various components of the device, such as one or more processors, a memory, a communication interface, one or more sensors, and a speaker, among others. The housing 650 includes one or more ventilation holes 600 to allow for convection and sound transmission to and from the various components of the video tag device 106. The housing 650 includes a multi-purpose button 524 to, for example, power the video tag device 106 on or off, activate the video tag device 106 as discussed below, and enable pairing, such as Bluetooth pairing, with the device, among others. In some implementations, the button 524 can be surrounded by a light diffuser 525 to indicate the status of the video tag device 106, such as whether the device is powered on, whether the device is functioning properly, or whether the device is connected to another telematics device 101 or the mobile device 104, or combinations of them.

The housing 650 includes one or more adhesive strips 602 to affix the video tag device 106 to, for example, an inside surface of a windshield of a vehicle. Each of the adhesive strips 602 can include a permanent or semi-permanent adhesive or epoxy to prevent tampering or unauthorized removal of the video tag device 106. The housing 650 can contain one or more batteries, such as lithium-ion (Li+) batteries, to provide power to the various components of the video tag device 106. To recharge the batteries, the video tag device 106 includes one or more solar panels 520 affixed within a recess of the housing 650 and configured to receive sunlight or other light from outside the vehicle through the windshield. In some implementations, the video tag device 106 can include an external power port 522, such as a USB-C port, and corresponding power circuitry to allow for a wired power connection to, for example, recharge the batteries or to provide system power when the charge of the one or more batteries are low or are not present. In some cases, the port 522 can be used for data transfer to or from the video tag device.

In some implementations, the video tag device 106 includes a moveable stalk 652 that extends from a bottom of the housing 650 along a first axis 604. We use the term "stalk" broadly to include a component, device, part, or other object that extends, stems, or otherwise protrudes from another object. In some cases, a stalk can be elongated or oblong with its shorter dimension being narrower than the width of the other object. The moveable stalk 652 can be rotatably coupled to the housing 650 by a pivot mechanism 606. In this way, the stalk 652 can be rotated about a second axis 608 that is generally perpendicular to the first axis 604. In some implementations, the pivot mechanism 606 can include one or more O-rings to provide friction that holds the pivot mechanism 606 in place after the position of the moveable stalk 652 is set by a user. In some cases, the material of the one or more O-rings can be selected to have a certain hardness, such as a Shore A hardness of about 75 to about 90, to minimize movement of the pivot mechanism 606 due to hysteresis and vibration in the vehicle. In some implementations, the pivot mechanism 606 can include an electromechanical actuator configured to move the stalk about the second axis of the pivot mechanism 606 relative to the housing in response to signals from, for example, a processor of the video tag device 106. The processor may provide the signals to cause the actuator to move the stalk about the second axis in response to, for example, a remote control signal from a user of the video tag device 106, a determination that the stalk should be moved to optimize the view of one or more cameras on the stalk, or a determination that the stalk should be moved to focus the view of one or more cameras on the stalk on a particular point, among others.

The movable stalk 652 can include one or more cameras, including one or more inward-facing cameras 610 (that is, a camera generally facing the inside of the vehicle when the video tag device is mounted on the windshield) positioned at a lower end 612 of a rear side 614 of the stalk 652 to capture images, video, and audio of an interior 616 of a vehicle, and one or more outward-facing cameras 618 positioned at the upper end 620 on the opposite side 622 of the stalk 652 to capture images and video of an area exterior 624 to the vehicle, such as the road 626, as shown in FIG. 7a. Positioning the outward-facing camera higher than the inward-facing camera improves the direction of view 628 of each of them for its viewing objective. Rotating the stalk about the second axis can improve the angle of view 630 and field of view 632 for either or both of the inward-facing camera and the outward-facing camera. In particular, the angle of view and field of view of the inward-facing camera can be matched to the interior of the vehicle to improve the view of both the front seats and rear seats of the vehicle.

In some implementations, the inward-facing camera 610 can be an infrared (IR) camera, and the video tag device 106 can include an IR illuminator 611, such as an IR light-emitting diode (LED), to illuminate the field of view of the camera 610. In some implementations, the outward-facing camera 618 can be an IR camera or a color camera. In some cases, the inward-facing camera 610 or the outward-facing camera 618, or both, can include a wide-angle lens. A connector, such as a flexible printed circuit board (PCB), can provide an electrical power and data connection between the housing 650 and the stalk 652.

In some cases, at least a portion of the stalk 652, such as the portion that houses the inward-facing camera 610, can be rotatable about the first axis 604 to cause the inward-facing camera 610 to pan within the interior of the vehicle, as shown in FIG. 7b. In this way, the inward-facing camera 610 can provide a 360-degree view of the interior of the vehicle and the exterior of the vehicle as seen through the windows of the vehicle. In some cases, the stalk 652 can include an actuator configured to move the rotatable portion of the stalk 652 about the first axis 604 in response to signals from, for example, a processor of the video tag device 106. In some implementations, the inward-facing camera 610 or the outward-facing camera 618, or both, can be configured to zoom in or out in response to signals from a processor of the video tag device 106.

The moveable stalk 652 can include an indicator 619, such as a multi-color LED and a light diffuser. The indicator 619 may be on the same side as the outward-facing camera 618 so that the indicator is viewable from the outside of a vehicle when the video tag device 106 is mounted on a windshield. A processor of the video tag device 106 can provide one or more signals to the indicator 619 to cause the indicator to display a light or a selected color of light, for example, to allow a user to locate the vehicle 108.

Various modifications to the video tag device 106 are possible. For example, in some implementations, the stalk 652 can extend from a top or a side of the housing 650. In some cases, the stalk 652 can extend from the housing 650 at an angle such that the first axis 604 is at an angle to the second axis 608. In some cases, at least a portion of the stalk 652, such as the portion that houses the inward-facing camera 610, can be extendable and retractable along the first axis 604 to, for example, change the vertical position of the inward-facing camera 610 (or the outward-facing camera 618 or both). The extension and retraction of the stalk 652 can be manual or automatic, such as by an electromechanical actuator, or both. In some implementations, the video tag device 106 can include components in addition to those described here, such as a display for presenting a real-time view of the inward-facing camera or the outward-facing camera, or another user interface, or combinations of them. In some cases, the components described as being within the housing 650 can included within the stalk 652 (or vice versa).

Referring again to FIGS. 1a and 1b, the video tag device 106 can transmit telematics data, including a panic alert or other safety alert and the audio, image, and video signals and data generated in response to the alert, and combinations of them, to another telematics device 101, a mobile device 104, or a server 110, or through the mobile device 104 to the other telematics device 101 or the server 110, or combinations of them. In some cases, the video tag device 106 can transmit the telematics data to the mobile device 104 that generated or transmitted the panic alert or other safety alert. After receiving or otherwise obtaining the telematics data, the mobile device 104 can store the telematics data locally or transmit 126 the telematics data to a server 110 (or another telematics device 101) over the network 128, or both. In some cases, the mobile device 104 may queue the transmission of the telematics data until the mobile device connects to a certain type of network, such as a Wi-Fi network, to avoid cellular data usage.

The server 110 (or the telematics devices 101 or the mobile device 104, or combinations of them) may process the telematics data to, for example, detect a panic situation or other safety concern, verify a panic alert or other safety alert, detect a vehicle crash, reconstruct a vehicle crash, determine driver behavior, confirm operation of the safety technology 100, or verify participants of the technology 100, among others, and combinations of them. The server 110 may store the telematics data, along with other information about the participants, components, and devices in the technology 100, and associations among them, in a database 130 that can communicate with the server 110. The database 130 may be implemented using one or more non-transitory computer-readable storage mediums including, but not limited to, hard disk drives, solid state drives, optical storage drives, or combinations of them.

As shown in FIG. 8, the server 110 may include hardware and software components, such as one or more processors 800, a memory 802, and a communication interface 804, which are interconnected by a data bus 806. The memory 802 can be any non-transitory computer-readable storage medium and may store computer-readable instructions executable by the processors 800. The memory 802 may store executable instructions associated with a panic determination module 808, a panic alert verification module 810, a crash reconstruction module 812, a driver behavior module 814, and other modules, to enable the server 110 or other components and devices to carry out the techniques described here.

The server 110 or other components and devices can use the communication interface 804 to transmit and receive raw or processed data or both, such as the telematics data, including the panic alert data and the audio, image, and video data, among other information, to and from other components or devices of the technology 100. For instance, the server 110 or other devices or components may transmit or receive data to or from the database 130 for storage purposes, to or from the telematics devices 101, such as the tag device 102 and the video tag device 106, or the mobile device 104 using the network 128, or to or from a computing device 112 using a network 132, which may be the Internet or any other suitable data transmission network. The server 110 can provide the telematics devices 101, the mobile device 104, or the computing device 112, or combinations of them with software or an interface, such as an application programming interface (API) or a web service, which allows for visualization, interaction, or further processing of the data, for example.

In some implementations, the panic determination module 808 (an example of a safety determination module) of the server 110 can process the telematics data to detect a panic situation or other safety concern and generate a panic alert or other safety alert using any of the techniques discussed here. The server 110 can then transmit the panic alert to the video tag device 106 or another component or device to cause the device to capture, store, or transmit (and combinations of them) telematics data, such as the audio, image, or video data, or combinations of them, or to adjust one or more telematics data collection properties, such as the rate or resolution of data capture, or both. In some cases, the server 110 (or another component or device of the technology 100 or combinations of them) can transcode the audio, image, or video data, or combinations of them, before storage or transmission.

In some cases, such as those in which a panic alert has been generated in the technology 100, the panic alert verification module 810 can verify the panic alert or other safety alert by, for example, processing the telematics data generated in response to the alert to confirm the existence of the panic situation or other safety concern. In some implementations, the panic alert verification module 810 can apply machine learning or artificial intelligence techniques to provide accurate verification of the panic alert and reduce the chance of false positives. The panic alert verification module 810 may cause the server 110 to provide a user interface on a computing device 112, which may include one or more computing devices or servers, or both, associated with a participant of the technology 100, to display the telematics data and other information to the participant of the technology 100 for verification or other review of the panic alert. For example, in some cases, the panic alert verification module 810 can present a user interface on a computing device 112 associated with a trusted third party, such as an automotive safety organization, an insurance company, a ridesharing company, an emergency service, a call center, an analyst, a researcher, a host of the technology, or combinations of these participants. In some cases, the panic alert verification module 810 can create one or more queues of panic alerts for review or analysis by a third party, and can notify the third party when a panic alert is added to the queue. In this way, the panic alert and its associated telematics data can be presented to a trusted third party who may verify the panic situation and determine an appropriate response, such as to contact one or more occupants of the vehicle or to dispatch one or more emergency responders. In some cases, the third party, such as an insurer, can use the presented panic alert and its associated telematics data to estimate damages to the vehicle 108 or another vehicle, estimate injuries to a user of the vehicle 108 or a user of another vehicle, determine fault of a vehicle crash, determine a cost of insurance for the vehicle 108 or the driver of the vehicle 108, identify fraudulent insurance claims, or identify high risk roads or routes, or combinations of them, among others.

For example, FIGS. 9a and 9b illustrate a user interface 900 for presenting the telematics data and other information associated with a panic alert or other safety alert. The user interface 900 may be provided by the server 110 to, for example, a computing device 112 or a mobile device 104 associated with a participant of the technology 100. As shown in FIG. 9a, the user interface 900 includes a searchable list of panic alerts or other safety alerts 902 associated with a user 904, such as a driver 150, a passenger 152, or a third party reviewing or responding to a panic alert, including a government agency, an insurance adjuster, a ridesharing company, an emergency service, a call center, an analyst, a researcher, or a host of the technology 100, or combinations of them, among others. The user interface 900 can include various information about each panic alert 902 in the list, such as an ID 906 of the panic alert, a role 908 of the user who triggered the panic alert (e.g., rider or driver), a date and time 910 that the panic alert was generated, a username 912 of the user who triggered the panic alert, a user ID 914 of the user who triggered the panic alert, a type of vehicle 916 associated with the panic alert, and a unique device identifier 540, such as a MAC address, of the video tag device 106 or other telematics device 101 associated with the panic alert, and combinations of them.

After selecting a panic alert 902, the user 904 is shown a user interface 920 containing additional details and telematics data associated with the panic alert or other safety alert. For instance, the user interface 920 includes a snapshot image 922 captured at the time of the panic alert by, for example, an inward-facing camera of the video tag device 106. In some cases, the user interface 920 can include the audio 924 and the video 926 captured by the video tag device 106 for a predetermined period of time (e.g., 5 minutes) after the panic alert was generated. The user interface 920 can include playback features to allow the user 904 to listen to the audio 924 or watch the video 926 or both directly within the user interface 920. In some cases, the user interface 920 can include the geographic coordinates 928 of the vehicle 108 when the panic alert was generated, as well as an indicator 930 identifying the geographic coordinates on a map 932. In some implementations, the user interface can include additional telematics data or other information associated with the panic alert 902, such as a description of the panic situation that triggered the panic alert (e.g., activation of a physical panic button on the tag device 102, activation of a software panic button on the mobile device 104, a vehicle crash, etc.), a snapshot image captured by an outward-facing camera of the video tag device 106, video captured by the outward-facing camera of the video tag device 106, a crash reconstruction, and a summary of driver behavior, among other information, and combinations of them.

In some cases, such as those in which a panic alert or other safety alert is generated in response to a vehicle impact or a vehicle crash, the crash reconstruction module 812 of the server 110 can process the telematics data, including the audio, image, and video data from the video tag device 106, to reconstruct the vehicle impact or the vehicle crash. For example, the crash reconstruction module 812 can process the telematics data to determine one or more crash metrics and other features of a crash such as those described in U.S. patent application Ser. No. 16/035,861, entitled "Vehicle Telematics of Vehicle Crashes," filed Jul. 17, 2018, the entire contents of which are incorporated by reference. The crash reconstruction module 812 can provide a user interface to the computing device 112 or another component in the technology 100 with a visual or textual description of the crash, along with various crash indicators, metrics, and analytics, to give insight regarding how the crash occurred, how severe the crash was, and how significant the vehicle damage and personal injuries are, and combinations of them.

In some implementations, the driver behavior module 814 of the server 110 can process the telematics data, including the audio, image, and video data from the video tag device 106, to analyze driver behavior or driver performance or both. For example, the driver behavior module 814 can process the telematics data to identify one or more risky driving behaviors of the driver, such as distracted driving, speeding, hard braking, hard acceleration, tailgating, swerving, and drifting, among others. In some cases, the driver behavior module 814 can apply machine learning, artificial intelligence, or behavioral science, or combinations of them, to assess the one or more risky driving behaviors within the context of the road environment. The driver behavior module 814 can provide a user interface to, for example, a mobile device 104 or a computing device 112 associated with the driver with a textual or visual summary of the driver's behavior and with feedback on how the driver might improve his or her driving performance. In some implementations, the driver behavior module 814 can derive a score or other metric associated with the driver's performance, and can encourage the driver to improve his or her driving score through gamification, rewards, and other engagement features.

Although the server 110 is described as processing the telematics data associated with the vehicle 108 to verify the panic alert, reconstruct a crash, or analyze driver behavior, other components and devices of the technology 100, such as the telematics devices 101, including the tag device 102 and the video tag device 106, the mobile device 104, or the computing device 112, or combinations of them, may process the telematics data in addition to, in combination with, or instead of the server 110 to carry out the techniques described here. Further, although only one server 110, one database 130, and one computing device 112 are illustrated in FIG. 1a, the technology 100 may include any number of computing devices and data storage devices (located in a single place or distributed and) communicatively connected using any number of networks.

As shown in FIG. 10, in some examples, each step of an operational process 1000 of the safety technology 100 can be carried out by various hardware and software components of the technology 100, including the telematics devices 101, such as the tag device 102 and the video tag device 106, the mobile device 104, the server 110, and the computing device 112, and combinations of them, among others. Although the operational process 1000 is discussed from the context of a user of a vehicle 108, such as a driver, a passenger, or another occupant of a vehicle, or a person who is to become or has recently been an occupant of vehicle, the techniques described apply equally to other participants of the technology 100.

Figure 11:
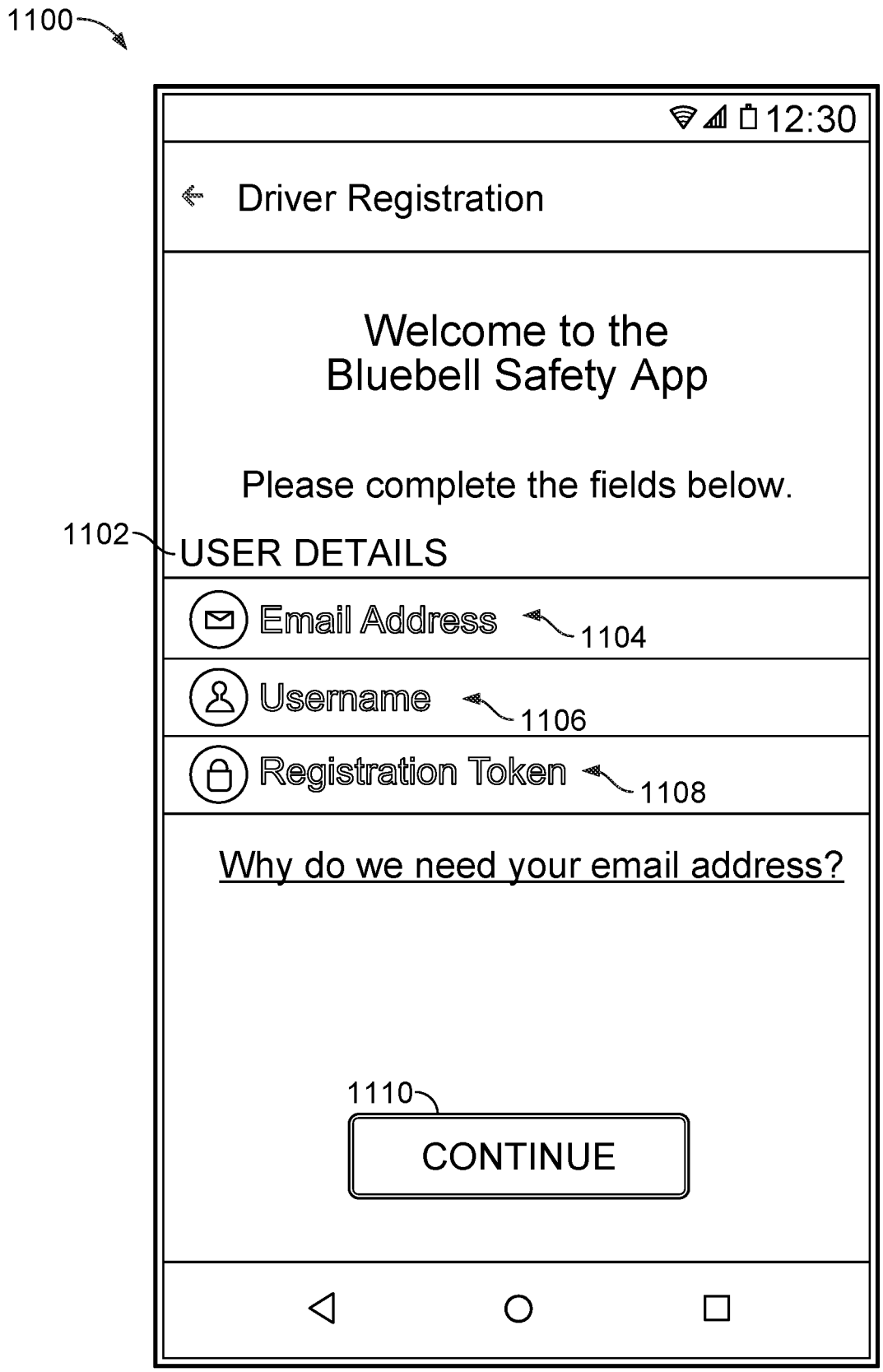

The process 1000 can begin with registration of a user with the technology 100 (1002). In some implementations, the user can register an account with the technology using, for example, a user interface presented by an application module 310 executing on the user's mobile device 104. As shown in FIG. 11, a user interface 1100 can prompt the user to input various user details 1102, such as an email address 1104, a username 1106, and a registration token 1108. The email address 1102 can be used by the technology 100 to, for example, contact the user if the user experiences a panic alert or other safety alert, or recover the user's account with the technology 100, or both. The username 1106 can be a unique username used by the technology 100 to associate the user with one or more components or devices in the technology, such as the mobile device 104 or a telematics device 101, or both. The registration token 1108 can be used by the technology 100 to associate the user with one or more participants of the technology, such as a ridesharing company or another third party participant, to allow the technology to, for example, report safety alerts or other data involving the user to the associated participant and to tailor one or more user processes, functions, or interfaces, or combinations of them, among others, based on the associated participant. Once the user inputs the requested user details 1102 and activates a continue button 1110, the application module 310 can cause the mobile device 104 to transmit the user's email address 1104, username 1106, and registration token 1108 to the server 110. The server 110 can store the user details 1102 in, for example, the database 130 to complete registration of the user with the technology 100. In some cases, the transmission can include a unique device identifier 318 of the mobile device 104 along with the user details 1102, and the server can use the device identifier 318 and one or more of the user details 1102 to create an association between the user and the mobile device 104 (or between the user and a telematics device 101, or both) in, for example, the database 130.

In some cases, the user can activate a video tag device 106 in the technology 100 (1004). In some implementations, a user interface presented by an application module 310 executing on the user's mobile device 104 can guide the user, who may be a driver of a vehicle 108, through the activation process, as shown in FIG. 12. For instance, a user interface 1200 can request that the user ensure that one or more communication interfaces, such as Bluetooth and Wi-Fi communication interfaces, are enabled on the user's mobile device 104, and can prompt the user to activate the multi-purpose button 524 on the video tag device 106 to, for example, begin activation and establish a Bluetooth communication channel between the video tag device 106 and the mobile device 104. Once a Bluetooth connection is established between the video tag device 106 and the user's mobile device 104, the application module 310 can present a user interface 1202 with an indication 1204 of a unique device identifier 540, such as a MAC address, of the video tag device 106. The user can press a confirm button 1206 to confirm that the device identifier 540 presented in the user interface 1202 matches the device identifier printed on the video tag device 106, and the application module 310 can cause the mobile device 104 to transmit a notification of the activation of the video tag device 106 to the server 110. In some cases, the notification transmitted by the mobile device 104 can include the device identifier 540 of the video tag device 106, and the server 110 can store the device identifier 540 in the database 130 to complete activation. In some cases, the notification can include the username 1106 of the user of the mobile device 104 or a device identifier 318 of the mobile device 104, or both. In this way, the server 110 can create an association among the user, the mobile device 104, and the video tag device 106 in, for example, the database 130 so that the components and devices in the technology 100 can identify panic alerts or other telematics data associated with the user, the mobile device 104, or the video tag device 106, or combinations of them. In some cases, the association among the user, the mobile device 104, and the video tag device 106 can be updated each time the mobile device 104 connects to the video tag device 106 to account for changes, such as a new or different user connecting to the video tag device 106.

Figure 13:
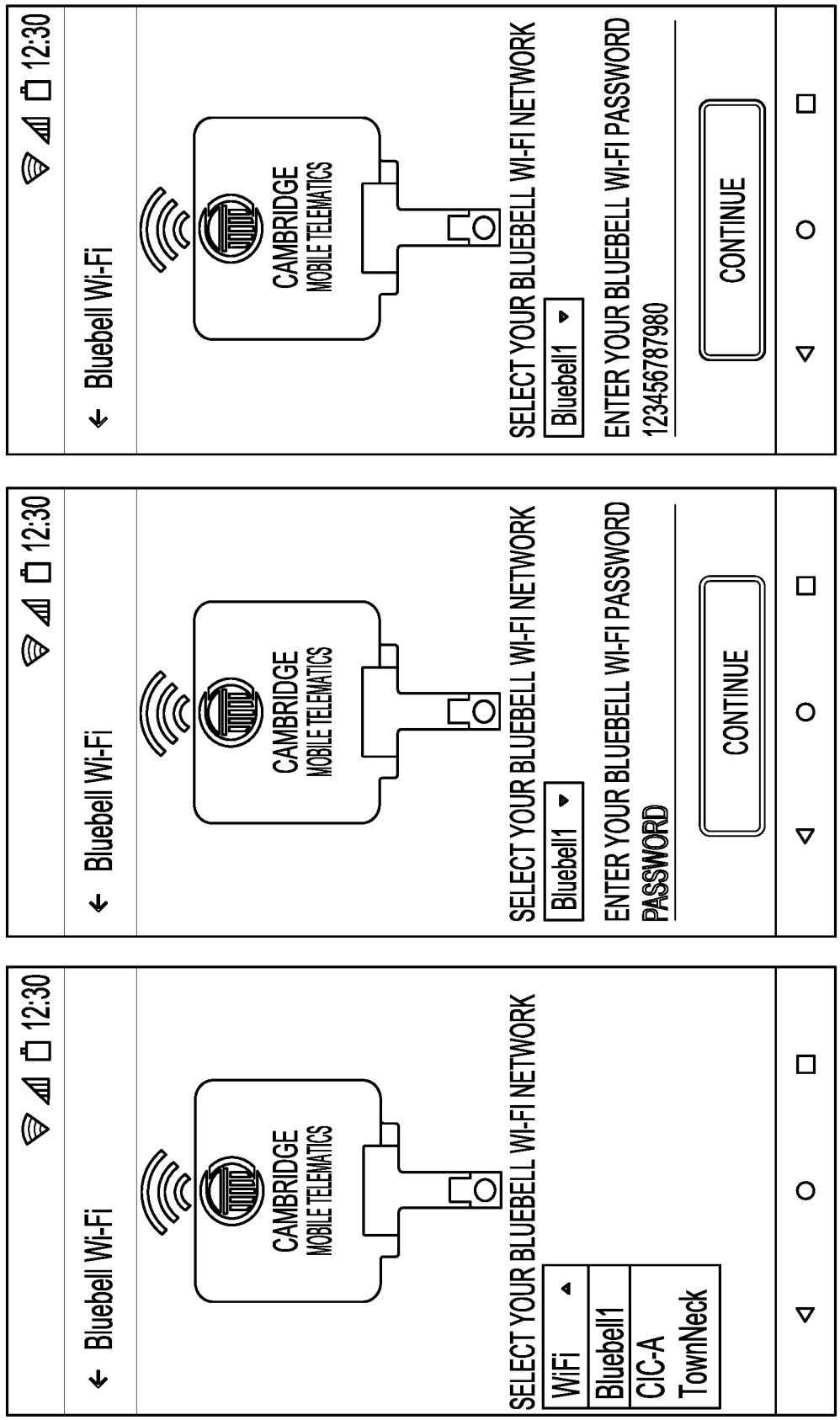
Figure 15:
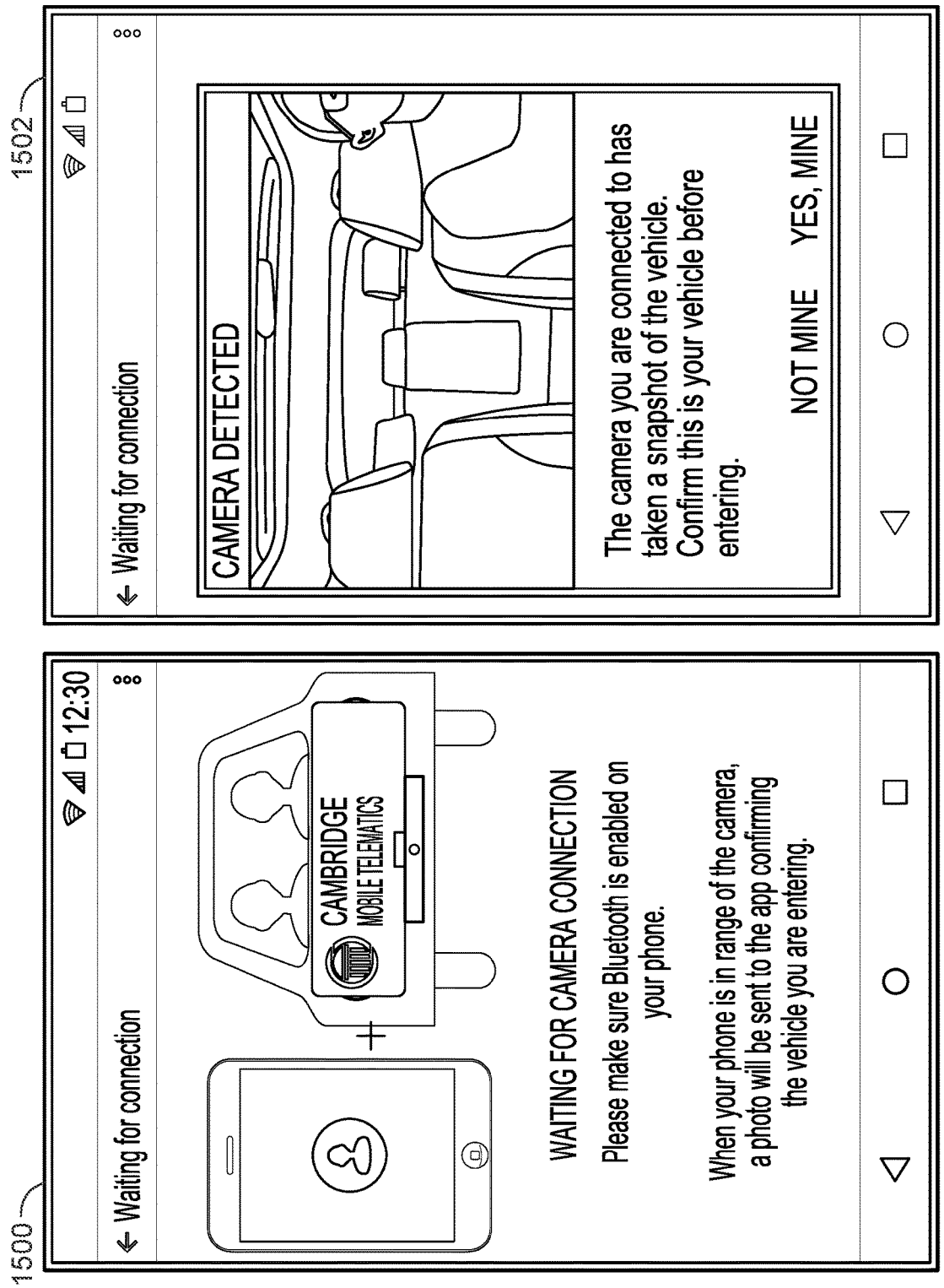

In some implementations, the application module 310 executing on the user's mobile device 104 can guide the user to setup a Wi-Fi connection between the user's mobile device 104 and the video tag device 106, as shown in FIG. 13. For instance, the application module 310 can present a user interface on the user's mobile device 104 that prompts the user to select the Wi-Fi network of the video tag device 106 and enter the network password to establish a Wi-Fi communication channel between the mobile device 104 and the video tag device 106.

Once the video tag device 106 is activated, in some implementations, the technology 100 can guide the physical installation of the video tag device 106 in the vehicle 108 (1006). The installation guide may be provided by an application module 310 executing on a mobile device 104 of the user of the video tag device 106. As shown in FIG. 14, the application for guiding installation can include an interactive user interface 1400 having a reference image 1402 and a live video feed 1404. The reference image 1402 can demonstrate the view of an inward-facing camera of the video tag device 106 when it is properly positioned on, for example, a windshield of the vehicle 108. The live video feed 1404 can show the view of the inward-facing camera of the video tag device 106 in real-time. In some cases, the reference image 1402 and the live feed 1404 can show the proper and real-time view of an outward-facing camera of the video tag device 106 instead of or in addition to the inward-facing camera view. In this way, the user interface 1400 provides feedback that allows the user to achieve proper positioning of the video tag device 106. In some cases, the interactive user interface 1400 can compare an image from the live video feed 1404 to the reference image 1402 to determine one or more deviations from optimal positioning of the video tag device 106, and can include one or more visual or audible directions that further guide the user to improve the positioning. Once the position of the video tag device 106 is optimized, the user can proceed 1406 to complete installation 1408.

After the user is registered (and, in some cases, after the video tag device 106 is activated and installed in the vehicle 108), the user can participate in the technology 100. However, in some cases, one or more components or devices of the technology 100 at the vehicle 108 may not be operating properly. Further, in some cases, the technology 100 may not be able to verify the users at the vehicle 108 due to, for example, a user entering the wrong vehicle or a vehicle with the wrong driver. In each of these cases, the technology may be prevented from recognizing the safety concerns of the vehicle users. Thus, to ensure safety, the active operation of the technology 100 for a particular video tag device 106 (or another telematics device 101) can be confirmed and its users can be verified (1008). The confirmation and verification process can be carried out periodically or in response to certain events, such as each time a user connects, or attempts to connect, to the technology 100, each time a user or a mobile device of the user enters or comes within a proximity of a vehicle 108 having the technology, each time one or more components or devices of the technology are powered on, each time the vehicle is turned on, each time the vehicle is in use, or combinations of them, among others.

In some implementations, an application module 310 executing on a mobile device 104 can carry out the confirmation and verification process. For example, in some cases, the user is a passenger or is about to become a passenger in a vehicle 108. The application module 310 can receive or otherwise obtain a unique device identifier 540 of the video tag device 106 in the vehicle 108, for example, by querying the server 110 or the database 130 of the server 110 for the device identifier 540 associated with the vehicle 108 or the driver of the vehicle 108, among others. Once received, the application module 310 can use the device identifier 540 to connect the mobile device 104 to the video tag device 106 in the vehicle 108, as shown in user interface 1500 of FIG. 15. Such a connection may be established over a Bluetooth network, a Wi-Fi network, or another wired or wireless network supported by both the mobile device 104 and the video tag device 106. If the application module 310 is successful in establishing a connection between the mobile device 104 and the video tag device 106 using the device identifier 540, the application module can determine that the users of the technology 100 are verified (that is, the device identifier of the components or devices of the technology, such as the video tag device, matches the device identifier stored in the database for corresponding device or component). By verifying the users through connection to the video tag device 106 in the vehicle 108, the technology 100 can increase safety by, for example, reducing the likelihood that a passenger is entering an unintended or unknown vehicle or the vehicle of an unintended or unknown driver, or that an unintended or unknown passenger is entering the vehicle with the driver. The following use case provides a non-limiting example of the verification process when the technology 100 is deployed in a ridesharing context:

1. Rider requests ride within the rideshare application running on the rider's mobile device.
2. Driver accepts the ride using the rideshare application running on the driver's mobile device and the driver drives to rider's location.
3. Rideshare application running on the rider's mobile device determines that the vehicle is not that of the driver who accepted the ride (incorrect device identifier).
4. Rideshare application running on the rider's mobile device warns rider not to enter the vehicle.
5. Rider does not enter vehicle and reports issue to rideshare company (or taps a software panic button in the rideshare application).

The application module 310 can confirm the active and proper operation of the technology 100 at the vehicle 108. For example, in some cases, the application module 310 can request or otherwise obtain an image from an inward-facing (or outward-facing) camera of the video tag device 106, and can present the image on the user's mobile device 104 for user verification, as shown in user interface 1502 of FIG. 15. If the user confirms that the image presented on the mobile device 104 matches the actual vehicle interior, the mobile application can determine that the video tag device 106 and the technology 100 are operational, and that the inward-facing camera of the video tag device 106 has an adequate view of the interior or the vehicle 108. In some cases, the mobile application can indicate the confirmation and verification to the user of the mobile device 104 by, for example, presenting a visual indication on the mobile device 104, presenting an image of the interior of the vehicle on the mobile device 104, presenting an image of the interior of the vehicle that includes the user on the mobile device 104, or causing the mobile device 104 or the video tag device 106 to produce an audible, user-selected chime, among others, and combinations of them. In this way, the user can receive confirmation that the technology 100 and its components are operating properly (or be warned if the technology 100 is not operating properly). The following use case provides a non-limiting example of the confirmation process when the technology 100 is deployed in a ridesharing context:

1. Rider requests ride within the rideshare application running on the rider's mobile device.
2. Driver accepts the ride using the rideshare application running on the driver's mobile device and the driver drives to rider's location.
3. Rideshare application running on rider's mobile device confirms the vehicle is that of the driver who accepted the ride (by verifying the device identifier).
4. A part of the safety technology, for example, the video tag device is not working properly.
5. Rider enters the vehicle and does not receive an image of the interior of the vehicle.
6. Rideshare application running on the rider's mobile device warns rider to exit the vehicle.
7. Rider exits the vehicle and reports issue to rideshare company (or taps a software panic button in the rideshare application).

Figure 16:
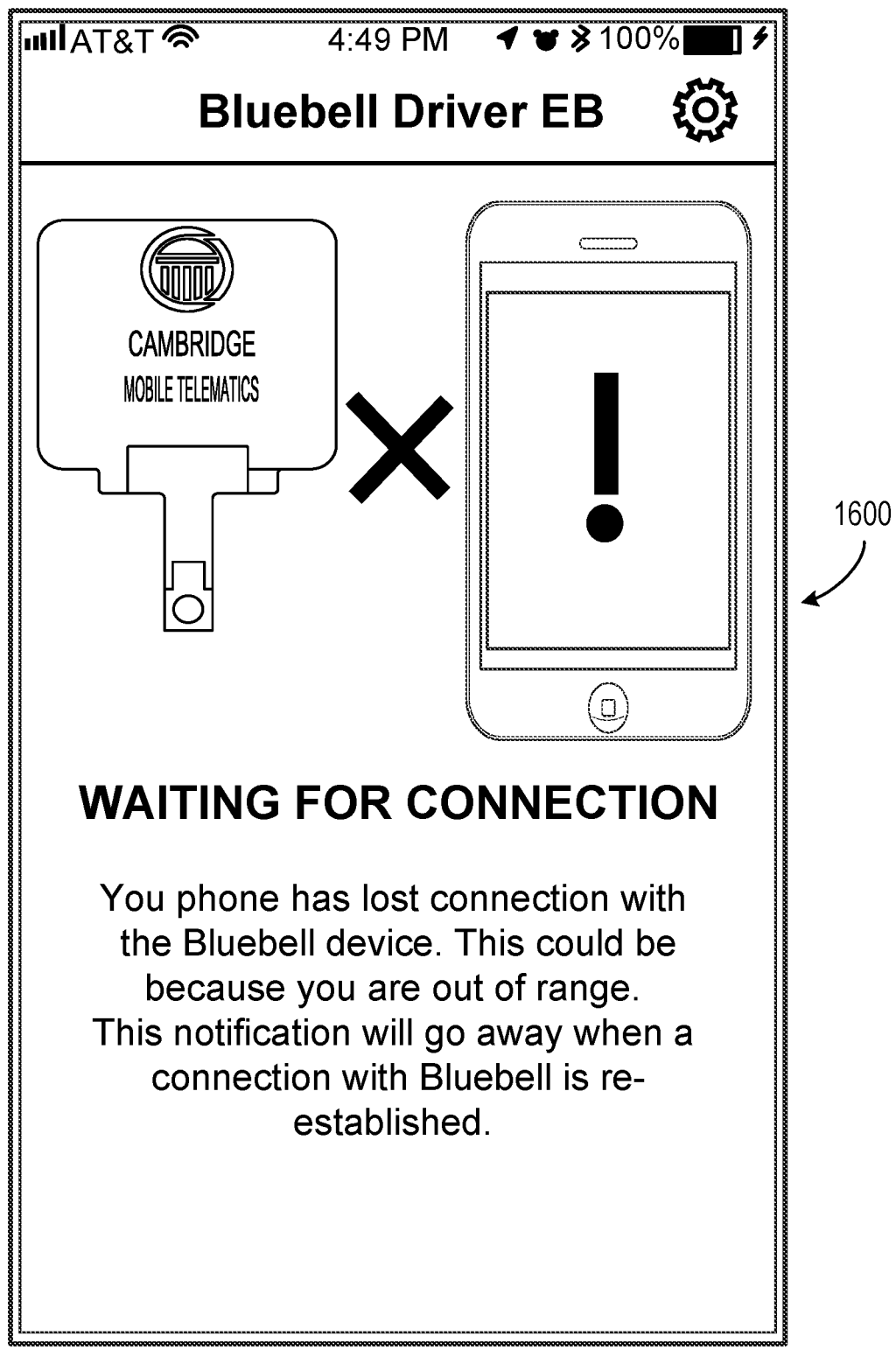

If confirmation or verification process is unsuccessful, the mobile application can determine that the technology 100 is malfunctioning or functioning in a way that poses a risk to the driver or passenger. The confirmation or verification process can be deemed unsuccessful if, for example, the mobile application is unable to connect the mobile device 104 to the video tag device 106, either using the received device identifier 540 or in general, the video tag device 106 is powered off, the video tag device 106 has a low battery, the video tag device 106 is experiencing an over temperature condition, or if the user of the mobile device 104 indicates that the image of the interior of the vehicle does not match the actual interior of the vehicle, among others, and combinations of them. In response to determining that the technology is malfunctioning, the mobile application can issue a notification 1600 to a user of the mobile device 104 informing the user that the technology 100 is experiencing an error, as shown in FIG. 16. The mobile application can cause the mobile device 104 to issue a notification of the error to the server 110. In some cases, the notification can include an indication of the error or fault within the technology 100. In some cases, the notification can provide a customized recommendation to the user of the mobile device based on the error and the role of the user. For instance, if the user is a driver and the video tag device 106 is experiencing a low battery error, the notification can identify the error and recommend that the driver charge the video tag device 106 before accepting any passengers. If the user is a passenger and the video tag device 106 is experiencing a low battery error, the notification can identify the error and recommend that the passenger not enter the vehicle 108. Both such notifications could be issued for a given error.

After detecting or receiving a request or a connection from the mobile device 104 or another component or device in the technology 100, the video tag device 106 can begin capturing audio, image, and video data at a relatively low rate (1010). For example, in some implementations the video tag device 106 can capture audio data at a sampling rate of about 8 kHz or about 16 kHz, and can capture video data at rate of about 1 Hz (1 fps). In some cases, the video tag device 106 can capture audio and video data at a reduced resolution, such as 4-bit audio or 8-bit audio and standard-definition (SD) video. The video tag device 106 can process the audio, image, and video data locally, for example, to detect a panic situation or other safety concern, or can send the data to another telematics device 101, a mobile device 104, or the server 110, or combinations of them, in real time for processing. By reducing the rate or resolution or both of the captured audio, image, and video data, the video tag device 106 can reduce power consumption and can produce smaller data files that use less space to store and are less burdensome to transmit, especially over cellular networks in which data usage is a concern.

The video tag device 106 can continue generating low rate (or low resolution or both) audio, image, and video data until the trip in the vehicle 108 ends, or until a panic situation or other safety concern is detected and a panic alert or other safety alert is generated in response (1012). We use the term "trip" broadly to include, for example, any instance of travel from an origin place to a destination place. In some cases, a trip is such an instance involving a single transportation mode (e.g., a car) or a single role of a person being transported (e.g., a driver) or both. As discussed above, a panic situation or other safety concern can be detected by one or more telematics devices 101, such as a tag device 102 or a video tag device 106, a mobile device 104, a server 110, or a computing device 112, or combinations of them, based on, for example, activation of a physical panic button, activation of a software panic button, a voiced utterance or command, a loud noise, an impact, a crash, a violation by the vehicle of a geographical boundary, distracted driving, an inertial event, a road hazard, close proximity of the vehicle to another vehicle or object, incapacity of a driver or occupant of the vehicle, a detection of a physical altercation in the vehicle, a detection that one or more safety components were tampered with, and combinations of them, among others.

If a panic situation is detected and a panic alert is generated, the panic alert can be transmitted to the server 110 and the video tag device 106, among others. The processors 500 and one or more sensor modules 508, such as the image capture module 536 and audio capture module 538, of the video tag device 106 can cause the device to capture one or more snapshot images using an inward-facing camera or outward-facing camera, or both, in response to the panic alert, and can transmit the one or more images, along with previously recorded audio data, to the server 110 (1014). In some cases, the video tag device 106 can also transmit previously recorded low-rate video data or other telematics data. The server 110 can use this audio, image, and video data, as well as other telematics data, to verify the panic alert. In some cases, the server 110 can transmit the data to a computing device 112 for verification and analysis to determine an appropriate response to the panic alert, such as to contact one or more occupants of the vehicle or to dispatch one or more emergency responders. In some cases, a user of the computing device 112, such as an insurer, can use the audio, image, video, and other telematics data to estimate damages to the vehicle 108 or another vehicle, determine fault of a vehicle crash, determine a cost of insurance for the vehicle 108 or the driver of the vehicle 108, identify fraudulent insurance claims, or identify high risk roads or routes, or combinations of them, among others.

The video tag device 106 can start capturing high-rate audio, image, and video data in response to the panic alert (1016). For example, the processors 500 and one or more sensor modules 508, such as the image capture module 536 and audio capture module 538, of the video tag device 106 can cause the device to capture audio data sampled at about 8 kHz or greater, at about 11 Hz or greater, at about 16 kHz or greater, at about 22 kHz or greater, at about 32 kHz or greater, or at about 44 kHz or greater, and video data sampled at about 15 Hz (15 fps) or greater or about 30 Hz (30 fps) or greater. In some cases, the video tag device 106 can capture high resolution audio and video data, such as 16-bit audio or 24-bit audio and high-definition (HD) video in response to the alert. The video tag device 106 can continue to capture the high-rate (or high resolution) audio, image, and video data for a predetermined period of time after receiving the panic alert, such as about 5 minutes.

The video tag device 106 can transmit the high-rate data to the server 110 or other components in real time, after the predetermined period of time expires, or in response to a request from the mobile device 104 or the server 110, or a combination of them, among others (1018). In some cases, the video tag device 106 can store the high-rate data locally. Once received, the server 110 can use the high-rate data to verify the panic situation and can store the data as evidence. The server 110 can provide the high-rate data to the computing device 112 for verification and analysis, such as through the user interface discussed with reference to FIGS. 9a and 9b.

The safety technology described here can be applied in a number of different contexts to improve the safety of users of a vehicle and reduce risky driving behavior. For example, in some implementations the safety technology can be deployed to monitor the safety risks exposed to or created by of a fleet of drivers, such as long-haul trucking fleets, armored truck fleets, or delivery fleets, among others. The safety technology can help identify dangerous drivers within a fleet so that performance can be improved, and can aid in discovering risky routes that should be avoided in the future. In some instances, the safety technology can be used by insurance companies to promote safe driving by customers and gather video and audio evidence for use in claims adjusting.

In some applications, the safety technology can be used in a ridesharing context. For example, a driver in a ridesharing platform may register with the technology 100 and may activate and install one or more components or devices of the technology, such as one or more telematics devices 101, including the tag devices 102 and the video tag device 106, in his or her vehicle 108. The driver may then use a rideshare application executing on his or her mobile device 104 to connect to the tag device 102, the video tag device 106, or another telematics device 101, or combinations of them. For instance, the rideshare application may obtain a device identifier or other connection information for the tag device 102, the video tag device 106, or another telematics device 101 that are associated with the driver from the storage of the mobile device 104, from a remote database associated with the rideshare application, or by executing one or more API calls to obtain the device identifier or other connection information from the server 110, or combinations of them. The rideshare application can then use this information to connect the mobile device 104 to the tag device 102, the video tag device 106, or another telematics device 101, or combinations of them, at the vehicle 108. Once connected, the driver can use the rideshare application to indicate (for example, to a computing device 112 associated with the ridesharing platform) that he or she is ready to receive ride requests.

A rider who is a registered participant in the technology 100 may request a ride in a rideshare application executing on his or her mobile device 104 and then may be paired with the driver and a corresponding vehicle. The rideshare application can then obtain a device identifier or other connection information for the tag device 102, the video tag device 106, or another telematics device 101 in the driver's vehicle 108 by, for example, accessing a remote database associated with the rideshare application or executing one or more API calls to the server 110, or both, to obtain the device identifiers and other connection information associated with the driver (or the vehicle, or both). In some cases, the rideshare application can include a whitelist of components or devices of the technology 100 that are permissible to connect to, and the application can store or otherwise include the device identifier or other connection information associated with the driver in the whitelist until the trip is complete. In some cases, the rideshare application executing on the driver's mobile device 104 can cause the indicator 512 of the video tag device 106 to show a predetermined color, and the rideshare application executing on the rider's mobile device can notify the user to look out for a vehicle 108 having an indicator with that color.

Once the driver arrives at the rider's location, the rider's mobile device can connect or attempt to connect to the tag device 102, the video tag device 106, or another telematics device 101, or combinations of them, in the driver's vehicle 108. The connection can be attempted before or after the rider enters the vehicle (or both). If the connection is successful, the rideshare application can begin the trip for the rider and the driver. In some cases, the rideshare application can execute one or more API calls to the video tag device 106 or the server 110, or both, to obtain an image of the interior of the driver's vehicle 108 and can present the image on the rider's mobile device 104, for example, to allow the rider to confirm that the video tag device 106 and the technology 100 are operational, and that the inward-facing camera of the video tag device 106 has an adequate view of the interior of the vehicle 108. In some cases, the rideshare application can obtain the image after the rider has entered the vehicle 108 so that the image pictures the rider. In some cases, the rideshare application can cause the rider's mobile device 104 or the video tag device 106 to produce an audible chime instead of or in addition to the image to confirm to the rider that the technology 100 is operational.

During the trip, one or more of the telematics devices 101, such as the tag device 102 and the video tag device 106, and the rider's and driver's mobile devices 104 can detect, measure, process, and generate telematics data for the rider and the driver. In particular, the video tag device 106 can capture audio, image, and video data at the vehicle 108 for the rider and driver. Under normal operations, the video tag device 106 can capture audio, image, and video data at a low rate or low resolution, or both. If a panic situation or other safety concern is detected during the trip, for example, by activation of a software panic button in the rideshare application or by one or more of the safety triggers discussed above, then a panic alert or other safety alert can be generated. The video tag device 106 can capture a snapshot image of the interior of the vehicle 108 and can store and transmit the image along with other telematics data, such as audio data, to the rideshare application or the server 110 or both. This data can be presented to the rideshare company or another participant, for example, on a computing device 112 associated with the rideshare platform. The video tag device 106 can record audio, image, and video data at a high rate or high resolution, or both, for a predetermined period of time in response to the panic alert or other safety alert. The video tag device 106 can store and transmit the data to the rideshare application (for example, to present the data to the rider or driver using the rideshare application) or the server 110, or both, among others, in real-time or after the predetermined period of time expires. Once the trip ends and the passenger exits the vehicle, the video tag device 106 can stop recording the audio, image, and video data.

If the rideshare application executing on the rider's or driver's mobile device 104 cannot confirm the proper operation of the technology 100 (for example, because the tag device 102, the video tag device 106, or the technology 100, or combinations of them, are malfunctioning or missing), then the rideshare application on the rider's mobile device 104 or the driver's mobile device 104, or both, can notify the respective user of the failed confirmation. Similarly, if the rideshare application on the rider's or driver's mobile device 104 cannot verify the users of the technology 100 at the vehicle 108 (for example, because the device identifier obtained by the rideshare application cannot be used to connect the mobile device 104 to the tag device 102 or the video tag device 106), then the rideshare application on the rider's mobile device 104 or the driver's mobile device 104, or both, can notify the respective user of the failed verification. In some cases, the indication of the failed confirmation or failed verification can include a recommendation to the user, such as to not enter the vehicle in the case of the rider, or to not accept a passenger in the case of the driver. In some cases, the rideshare application can cancel or otherwise end the trip in response to a failed confirmation or verification.

The technology can be applied to a wide variety of use cases, a few of which are discussed here.

Use Case #1: Rider and Driver are Safe Throughout the Trip
1. Rider requests ride within the rideshare application running on the rider's mobile device.
2. Driver accepts the ride using the rideshare application running on the driver's mobile device and the driver drives to rider's location.
3. Rideshare application running on rider's mobile device confirms the vehicle is that of the driver who accepted the ride (by verifying the device identifier).
4. The video tag device takes snapshot image of backseat of the vehicle using, for example, an inward-facing camera, and sends the image over a Bluetooth or Wi-Fi network to a rideshare application running on the rider's mobile device so that the rider can confirm that the technology is working.
5. The video tag device begins recording audio and video at a low rate, and stores a buffer of these streams. The video tag device takes snapshot image of the interior of the vehicle and sends to rider's mobile device.
6. The rider and driver are safe during the ride.
7. The rider arrives at correct destination and is dropped off
8. The video tag device stops recording the low-rate audio and video data.

Use Case #2: Rider's Safety at Risk before Entering the Vehicle
1. Rider requests ride within the rideshare application running on the rider's mobile device.
2. Driver accepts the ride using the rideshare application running on the driver's mobile device and the driver drives to rider's location.
3. Rideshare application running on the rider's mobile device determines that the vehicle is not that of the driver who accepted the ride (incorrect device identifier).
4. Rideshare application running on the rider's mobile device warns rider not to enter the vehicle.
5. Rider does not enter vehicle and reports issue to rideshare company (or taps a software panic button in the rideshare application).

Use Case #3: Rider's Safety at Risk before Entering the Vehicle
1. Rider requests ride within the rideshare application running on the rider's mobile device.
2. Driver accepts the ride using the rideshare application running on the driver's mobile device and the driver drives to rider's location.
3. Rideshare application running on rider's mobile device confirms the vehicle is that of the driver who accepted the ride (by verifying the device identifier).
4. A part of the safety technology, for example, the video tag device is not working properly.
5. Rider enters the vehicle and does not receive an image of the interior of the vehicle.
6. Rideshare application running on the rider's mobile device warns rider to exit the vehicle.
7. Rider exits the vehicle and reports issue to rideshare company (or taps a software panic button in the rideshare application).

Use Case #4: Rider Attacked During Ride
1. Rider requests ride within the rideshare application running on the rider's mobile device.
2. Driver accepts the ride using the rideshare application running on the driver's mobile device and the driver drives to rider's location.
3. Rideshare application running on rider's mobile device confirms the vehicle is that of the driver who accepted the ride (by verifying the device identifier).
4. The video tag device takes snapshot image of backseat of the vehicle using, for example, an inward-facing camera, and sends the image over a Bluetooth or Wi-Fi network to a rideshare application running on the rider's mobile device so that the rider can confirm that the technology is working.
5. The video tag device begins recording audio and video at a low rate, and stores a buffer of these streams. The video tag device takes snapshot image of the interior of the vehicle and sends to rider's mobile device.
6. During the trip the rider determines that he or she is in danger and triggers panic alert by activating a physical button on a tag device in the vehicle or by activating a software button in the rideshare application on the rider's mobile device.
7. A panic alert message is sent to the server and then onto the computing device, which may be a rideshare company's call center.
8. The video tag device begins recording high-rate audio, image, and video data and saves the recording locally.
9. Audio data and a snapshot image are sent to the rider's mobile device (the user who triggered the panic alert), the server, and the rideshare company's call center for confirmation of the panic alert.
10. High-rate audio, image, and video data is sent via Wi-Fi to the rider's mobile device after 5 minutes of recording. The rider's mobile device forwards the data to the server.
11. The rider's mobile device may be taken and turned off during the attack, but after panic button is triggered.

Use Case #5: Rider Driven Off-Route, Taken to 3rd Location, and Attacked
1. Rider requests ride within the rideshare application running on the rider's mobile device.
2. Driver accepts the ride using the rideshare application running on the driver's mobile device and the driver drives to rider's location.
3. Rideshare application running on rider's mobile device confirms the vehicle is that of the driver who accepted the ride (by verifying the device identifier).
4. The video tag device takes snapshot image of backseat of the vehicle using, for example, an inward-facing camera, and sends the image over a Bluetooth or Wi-Fi network to a rideshare application running on the rider's mobile device so that the rider can confirm that the technology is working.
5. The video tag device begins recording audio and video at a low rate, and stores a buffer of these streams. The video tag device takes snapshot image of the interior of the vehicle and sends to rider's mobile device.
6. Rider is driven off-route, but their alertness is impaired (asleep/intoxicated) so they cannot activate the panic alert button.
7. Rideshare application running on driver's mobile device detects that that vehicle is going off-route via geo-fencing features and triggers a panic alert.
8. Panic alert message is sent to the server and to the rideshare company's call center.
9. The video tag device begins recording high-rate audio, image, and video data and saves the data locally.
10. Audio data and a snapshot image are sent to the rider's mobile device (the user who triggered the panic alert), the server, and the rideshare company's call center for confirmation of the panic alert.
11. High-rate audio, image, and video data is sent via Wi-Fi to the rider's mobile device after 5 minutes of recording. The rider's mobile device forwards the data to the server.

12. The rider's mobile device may be taken and turned off during the attack, but after panic button is triggered.

Use Case #6: Driver Attacked During the Ride

1. Rider requests ride within the rideshare application running on the rider's mobile device.
2. Driver accepts the ride using the rideshare application running on the driver's mobile device and the driver drives to rider's location.
3. Rideshare application running on rider's mobile device confirms the vehicle is that of the driver who accepted the ride (by verifying the device identifier).
4. The video tag device begins recording audio and video at a low rate, and stores a buffer of these streams.
5. Rider enters the vehicle and receives preselect-selected audio chime to indicate the safety technology is functioning properly.
6. During the trip the driver determines he or she is in danger and triggers panic alert by activating a software panic button in the rideshare application on the driver's mobile device.
7. Panic alert message is sent to the server and to rideshare company's call center.
8. The video tag device begins recording high-rate audio, image, and video data and saves the data locally.
9. Audio data and a snapshot image are sent to the rider's mobile device (the user who triggered the panic alert), the server, and the rideshare company's call center for confirmation of the panic alert.
10. High-rate audio, image, and video data is sent via Wi-Fi to the driver's mobile device after 10 minutes of recording. The driver's mobile device forwards the data to the server.
11. The driver's mobile device may be taken and turned off during the attack, but after panic button is triggered.

Other implementations are also within the scope of the following claims.

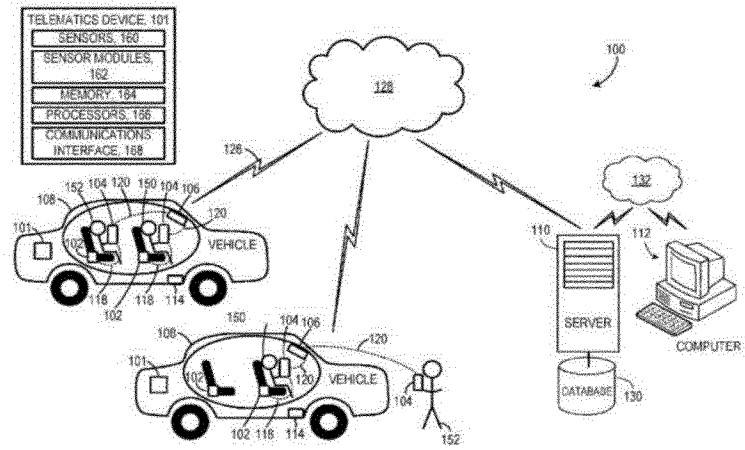

What is claimed is:

1. A method, comprising:
   producing telematics data by a telematics device affixed to a vehicle, the telematics data including audio, video, and acceleration data for the vehicle;
   receiving, at the telematics device, a personal safety alert generated in response to activation of a switch within the vehicle;
   in response to receiving the personal safety alert, by the telematics device:
      determining a time at which the personal safety alert was generated;
      identifying a unique identifier associated with the telematics device;
      obtaining one or more images from the telematics data produced at the vehicle;
      sending an indication of the personal safety alert to a server, the indication of the personal safety alert including the time at which the personal safety alert was generated, the unique identifier associated with the telematics device, and the one or more images;
      storing, at the telematics device, the telematics data produced within a predetermined time before the personal safety alert; and
      for a predetermined time after the personal safety alert, producing additional telematics data and storing the additional telematics data at the telematics device; and
   after sending the indication of the personal safety alert to the server,
      receiving, at the telematics device, a request from the server for at least one of the telematics data or the additional telematics data, the request including the time at which the personal safety alert was generated; and
      sending at least one of the telematics data or the additional telematics data to the server in response to the request from the server.

2. The method of claim 1, in which the personal safety alert is received from a mobile device over a wireless communication channel.
3. The method of claim 1, in which producing the telematics data comprises acquiring telematics data from one or more sensors at the vehicle.
4. The method of claim 1, in which producing the telematics data comprises producing the telematics data at the telematics device or a mobile device, or both.
5. The method of claim 1, in which the personal safety alert is associated with one or more impacts associated with the vehicle.
6. The method of claim 1, in which the personal safety alert is associated with a noise in the vehicle exceeding a predetermined noise threshold.
7. The method of claim 1, wherein the personal safety alert is generated in response to an utterance voiced within the vehicle.
8. The method of claim 1, in which the personal safety alert is associated with incapacity of a person at the vehicle.
9. The method of claim 1, in which the personal safety alert is associated with a relationship of a geographic location of the vehicle to a predetermined geographic boundary.
10. The method of claim 1, in which the personal safety alert is associated with an inertial event of the vehicle that exceeds a predetermined inertial magnitude.
11. The method of claim 1, in which the personal safety alert is associated with distraction of the driver of the vehicle.
12. The method of claim 1, in which the personal safety alert is silent or non-visible or both.
13. The method of claim 1, in which video data includes video of an interior of the vehicle.
14. The method of claim 1, in which the one or more images comprise images of an area exterior to the vehicle.
15. The method of claim 1, in which the one or more images comprise a video.
16. The method of claim 1, comprising sending the at least one of the telematics data or the additional telematics data to a mobile device.
17. The method of claim 1, in which the sending of the produced telematics data comprises sending the produced telematics data to a server.
18. The method of claim 1, in which sending the at least one of the telematics data or the additional telematics data comprises sending the at least one of the telematics data or the additional telematics data to the server for remote processing to verify the personal safety alert.
19. The method of claim 1, in which sending the at least one of the telematics data or the additional telematics data comprises sending the at least one of the telematics data or the additional telematics data to a mobile device over a first network for forwarding by the mobile device to the server over a second network, and in which the first network and the second network are different network types.
20. The method of claim 1, in which the server is associated with one or a combination of two or more of an automotive safety organization, an insurance company, a ridesharing company, an emergency service, a call center, a user of the telematics device, or a user of the vehicle.

21. The method of claim 1, comprising causing a user interface to display the telematics data, the additional telematics data, or the personal safety alert.

22. An apparatus comprising
a telematics device affixed to a vehicle and configured to:
produce telematics data at the vehicle, the telematics data including audio, video, and acceleration data for the vehicle;
receive a personal safety alert generated in response to activation of a switch within the vehicle;
in response to receiving the personal safety alert:
determine a time at which the personal safety alert was generated;
identify a unique identifier associated with the telematics device;
obtain one or more images from the telematics data produced at the vehicle;
send an indication of the personal safety alert to a server, the indication of the personal safety alert including the time at which the personal safety alert was generated, the unique identifier associated with the telematics device, and the one or more images;
store, at the telematics device, the telematics data produced within a predetermined time before the personal safety alert; and
for a predetermined time after the personal safety alert, produce additional telematics data and store the additional telematics data at the telematics device; and
after sending the indication of the personal safety alert to the server,
receive a request from the server for at least one of the telematics data or the additional telematics data, the request including the time at which the personal safety alert was generated; and
send at least one of the telematics data or the additional telematics data to the server in response to the request from the server.

23. A non-transitory storage medium storing instructions executable by a processor to:
produce telematics data at a telematics device affixed to a vehicle, the telematics data including audio, video, and acceleration data for the vehicle;
receive a personal safety alert generated in response to activation of a switch within the vehicle;
in response to receiving the personal safety alert:
determine a time at which the personal safety alert was generated;
identify a unique identifier associated with the telematics device;
obtain one or more images from the telematics device produced at the vehicle;
send an indication of the personal safety alert to a server, the indication of the personal safety alert including the time at which the personal safety alert was generated, the unique identifier associated with the telematics device, and the one or more images;
store, at the telematics device, the telematics data produced within a predetermined time before the personal safety alert; and
for a predetermined time after the personal safety alert, produce additional telematics data at the telematics device and store the additional telematics data at the telematics device; and
after sending the indication of the personal safety alert to the server,
receive a request from the server for at least one of the telematics data or the additional telematics data, the request including the time at which the personal safety alert was generated; and
send at least one of the telematics data or the additional telematics data to the server in response to the request from the server.

24. The method of claim 1, in which the indication of the personal safety alert is sent to the server from a mobile device.

25. The method of claim 1, wherein the telematics data and the additional telematics data are produced at different rates or resolutions.

26. The method of claim 1, wherein at least one of the telematics data or the additional telematics data are sent to the server automatically after sending the indication of the personal safety alert to the server.

27. The method of claim 1, the request is received in response to a selection of the personal safety alert at the server.

* * * * *

UNITED STATES PATENT AND TRADEMARK OFFICE
CERTIFICATE OF CORRECTION

PATENT NO. : 11,074,769 B2
APPLICATION NO. : 16/407502
DATED : July 27, 2021
INVENTOR(S) : Hari Balakrishnan et al.

It is certified that error appears in the above-identified patent and that said Letters Patent is hereby corrected as shown below:

On the Title Page

Delete "27 Claims," and insert -- 26 Claims, --, therefor as shown on the attached title page.

In the Claims

Column 44, Lines 50-52: Below "a mobile device." delete "17. The method of claim 1, in which the sending of the produced telematics data comprises sending the produced telematics data to a server.".

Signed and Sealed this
Twenty-sixth Day of April, 2022

*Katherine Kelly Vidal*

Katherine Kelly Vidal
*Director of the United States Patent and Trademark Office*

(12) United States Patent
Balakrishnan et al.

(10) Patent No.: US 11,074,769 B2
(45) Date of Patent: Jul. 27, 2021

(54) SAFETY FOR VEHICLE USERS

(71) Applicant: Cambridge Mobile Telematics Inc., Cambridge, MA (US)

(72) Inventors: Hari Balakrishnan, Belmont, MA (US); Ben Bowne, Rockwall, TX (US); Lewis David Girod, Arlington, MA (US); James E. Hicks, Jr., Newton, MA (US); Samuel Ross Madden, Newton, MA (US); Katherine Wellman, Dover, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

(21) Appl. No.: 16/407,502

(22) Filed: May 9, 2019

(65) Prior Publication Data
US 2020/0312062 A1 Oct. 1, 2020

Related U.S. Application Data

(60) Provisional application No. 62/823,811, filed on Mar. 26, 2019.

(51) Int. Cl.
*G07C 5/08* (2006.01)
*G07C 5/00* (2006.01)
(Continued)

(52) U.S. Cl.
CPC ............ *G07C 5/0816* (2013.01); *B60Q 9/00* (2013.01); *G07C 5/008* (2013.01); *G08B 21/02* (2013.01)

(58) Field of Classification Search
USPC ............ 340/425.5, 426, 12, 426.13, 426.16, 340/426.17, 426.18, 426.2
See application file for complete search history.

(56) References Cited

U.S. PATENT DOCUMENTS 6,980,092 B2 * 12/2005 Turnbull .................. B60R 1/12 307/10.1
7,266,204 B2 * 9/2007 Watson ..................... B60R 1/12 340/426.16
(Continued)

FOREIGN PATENT DOCUMENTS

EP 1785964 5/2007

OTHER PUBLICATIONS

U.S. Appl. No. 16/035,861, filed Jul. 16, 2018, Shea et al.
Estrada [online], "Meet the hot new dash cam you can control from your smartphone," bgr.com, Aug. 1, 2018, retrieved on Mar. 21, 2019, URL <https://bgr.com/2018/07/31/amazon-dash-cam-goluk-t2/>, 2 pages.
(Continued)

*Primary Examiner* — Brent Swarthout
(74) *Attorney, Agent, or Firm* — Fish & Richardson P.C.

(57) ABSTRACT

Personal safety concerns for users of vehicles can be indicated, identified, communicated, analyzed, or acted on to make the users and other participants in the technology aware of the safety concerns and to reduce the risks to the users associated with the safety concerns. Personal safety concerns can be recognized based on safety concern triggers. Once recognized, the personal safety concerns can be reported to the users and other participants in the technology by safety alerts. The safety alert can prompt one or more telematics devices at the vehicle to capture, store, or transmit telematics data, including, for example, audio, image, or video data or combinations of them. The captured telematics data can be used to verify the safety alert and the safety concern and present the captured data to a third party participant to enable the third party participant to determine an appropriate response or action.

26 Claims, 20 Drawing Sheets